(12) United States Patent
Stroman

(10) Patent No.: US 11,213,134 B2
(45) Date of Patent: Jan. 4, 2022

(54) TRAY WITH VARIABLE POSITIONING AND SUPPORT

(71) Applicant: Stroman Design, Inc., Boca Raton, FL (US)

(72) Inventor: Thomas Stroman, Boca Raton, FL (US)

(73) Assignee: STROMAN DESIGN, INC., Boca Raton, FL (US)

( * ) Notice: Subject to any disclaimer, the term of this patent is extended or adjusted under 35 U.S.C. 154(b) by 0 days.

(21) Appl. No.: 16/768,068

(22) PCT Filed: Nov. 28, 2018

(86) PCT No.: PCT/US2018/062929
§ 371 (c)(1),
(2) Date: May 28, 2020

(87) PCT Pub. No.: WO2019/108711
PCT Pub. Date: Jun. 6, 2019

(65) Prior Publication Data
US 2020/0359801 A1   Nov. 19, 2020

Related U.S. Application Data

(60) Provisional application No. 62/591,728, filed on Nov. 28, 2017.

(51) Int. Cl.
*A47C 7/68* (2006.01)
*A47B 13/08* (2006.01)

(52) U.S. Cl.
CPC .............. *A47C 7/68* (2013.01); *A47B 13/081* (2013.01)

(58) Field of Classification Search
CPC ......... A47C 7/68; A47B 13/081; A47B 27/18; A47B 27/06
USPC .......... 108/43, 44, 1, 2, 3, 49; 248/454, 444, 248/457
See application file for complete search history.

(56) References Cited

U.S. PATENT DOCUMENTS

| | | | | |
|---|---|---|---|---|
| 493,605 | A | * | 3/1893 | Tiffany ................... A47B 27/02 108/10 |
| 1,137,753 | A | * | 5/1915 | Gottesman ............. A47B 23/02 108/49 |
| 1,770,955 | A | * | 7/1930 | Strom ..................... A47B 23/00 108/8 |
| 1,845,868 | A | | 2/1932 | Eriksen |
| 2,054,098 | A | * | 9/1936 | Rich .................... A47B 23/001 108/1 |
| D139,764 | S | * | 12/1944 | Raucher ..................... D6/691.5 |

(Continued)

OTHER PUBLICATIONS

International Application No. PCT/US2018/062929, Search Report and Written Opinion dated Apr. 24, 2019.

*Primary Examiner* — Jose V Chen
(74) *Attorney, Agent, or Firm* — Ahmann Kloke LLP

(57) ABSTRACT

An apparatus comprises a tray including a plurality of radial openings. An inner tray support and an outer tray support are connected to the tray using a fixed connection that allows the tray to pivot within the inner tray support and the outer tray support. A spring-tensioned ball catch is configured to provide the tray a slip-locking connection through the plurality of radial openings of the tray that allows the tray to be rotationally adjusted within the inner tray support and the outer tray support.

18 Claims, 30 Drawing Sheets

(56) References Cited

U.S. PATENT DOCUMENTS

| | | | | |
|---|---|---|---|---|
| 2,495,250 A * | 1/1950 | Gilly | B23Q 1/5437 | 108/3 |
| 2,906,486 A | 9/1953 | Bellon | | |
| 2,703,265 A * | 3/1955 | Wolfe | A47B 23/02 | 248/214 |
| 2,709,818 A * | 6/1955 | Freese | A47B 23/02 | 5/507.1 |
| 2,844,429 A * | 7/1958 | Frey | A47B 23/002 | 108/43 |
| 3,080,980 A | 8/1961 | Gibbons | | |
| 3,652,051 A * | 3/1972 | McFarlane | A47B 23/001 | 248/444 |
| 3,988,021 A * | 10/1976 | Grover | A47B 3/00 | 473/15 |
| 4,494,465 A * | 1/1985 | Fick, Jr. | A47B 3/083 | 108/131 |
| 5,052,379 A | 10/1991 | Airy | | |
| 5,138,955 A * | 8/1992 | Manner | A47B 17/02 | 108/1 |
| 5,331,904 A * | 7/1994 | DiSimone | B25H 1/12 | 108/143 |
| 5,520,119 A * | 5/1996 | Eisenberg | A47B 23/002 | 108/43 |
| 5,598,786 A * | 2/1997 | Patterson | A47B 23/001 | 108/43 |
| 6,152,417 A * | 11/2000 | Randall | A47B 23/001 | 108/43 |
| 6,454,349 B1 | 9/2002 | Konya | | |
| 6,601,524 B2 * | 8/2003 | Janata | G01M 11/04 | 108/1 |
| 7,210,415 B2 * | 5/2007 | Brunson | B23D 45/044 | 108/104 |
| 7,594,475 B1 * | 9/2009 | Huang | A47B 9/08 | 108/10 |
| 8,505,470 B1 * | 8/2013 | Lira | A47B 23/04 | 108/138 |
| 2003/0155319 A1 | 8/2003 | Wishart | | |
| 2008/0251482 A1 | 10/2008 | Davis | | |
| 2015/0374119 A1 | 12/2015 | Joshi | | |

* cited by examiner

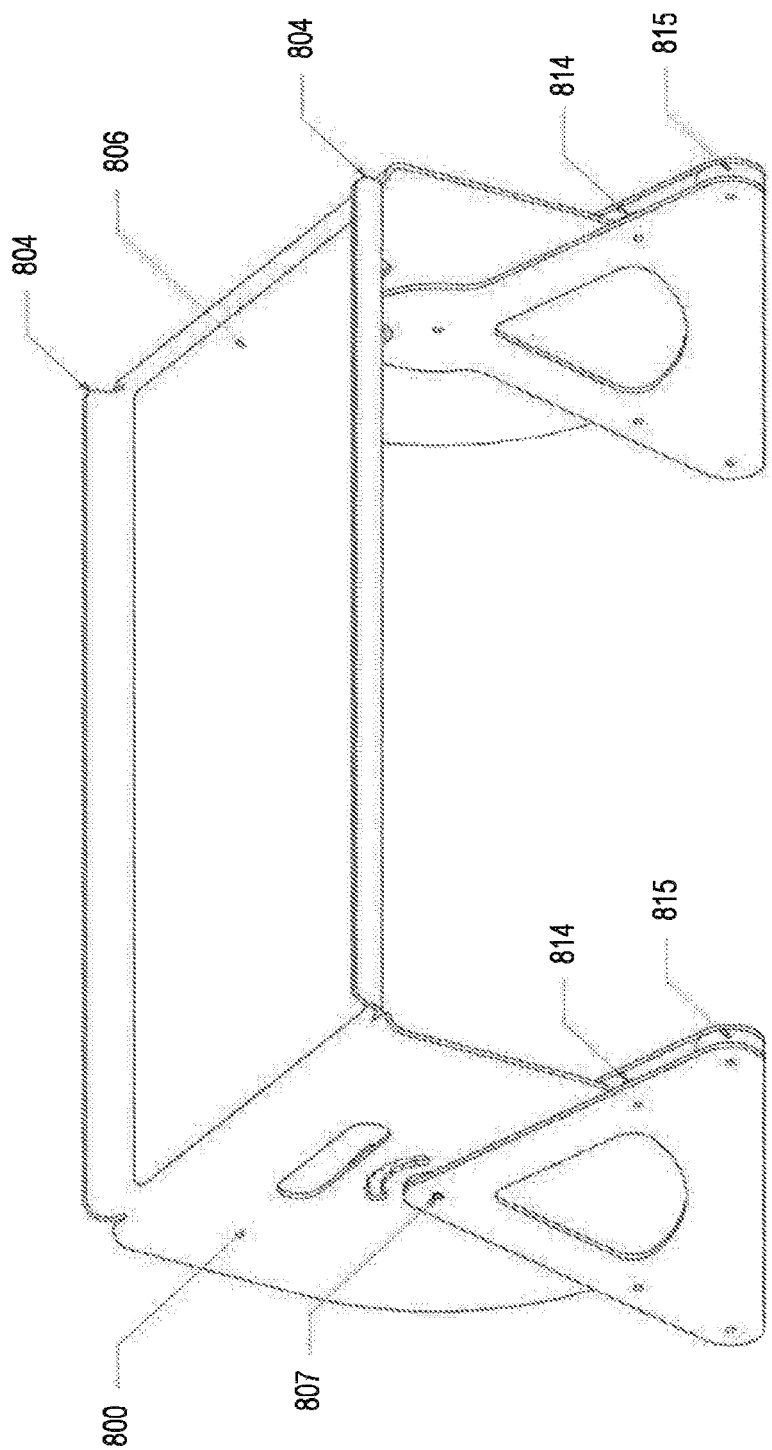

SIDE VIEW

TRAY MOUNTED LOCKING PLUNGER

TOP VIEW

FRONT VIEW

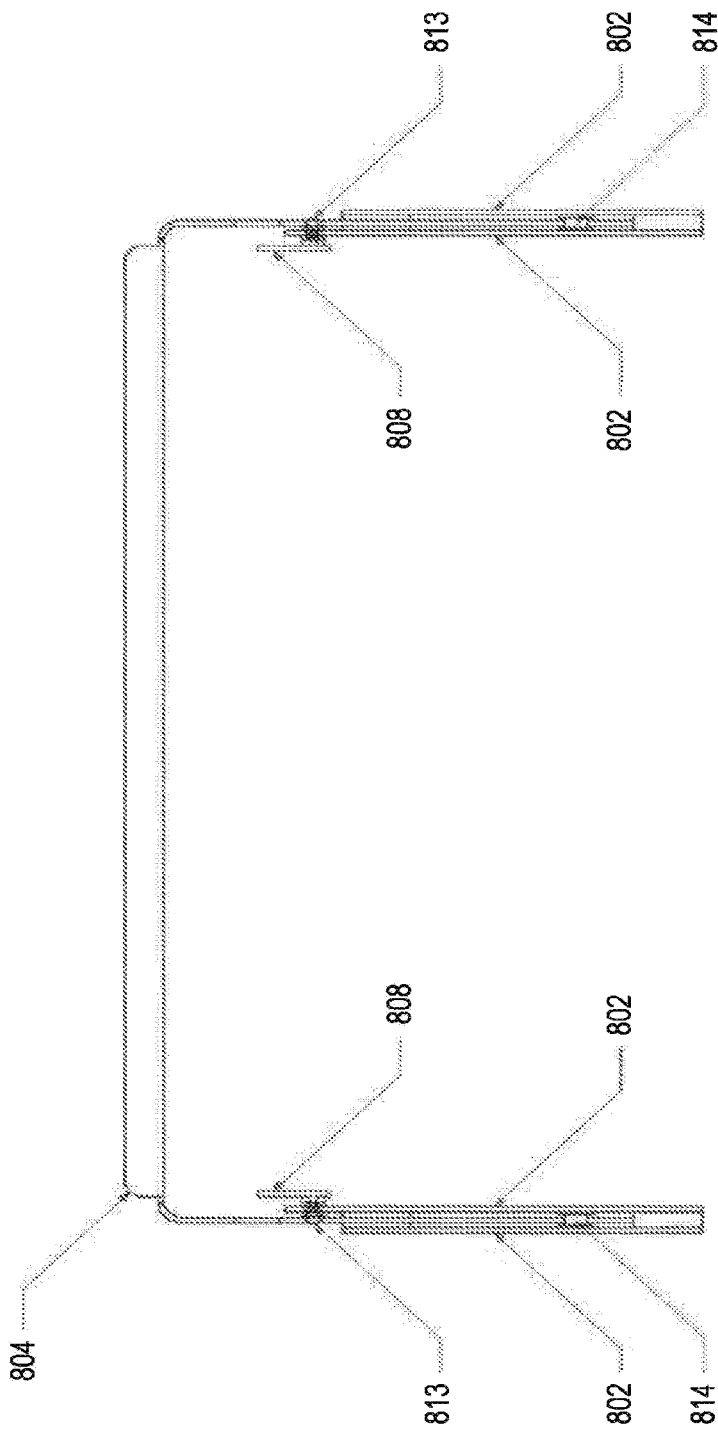

QUICK RELEASE CONFIGURATION

NESTED AND FREELY ROTATING TRAY

SYNCHRONOUS CHAIR - TRAY ROTATION

901
WALL MOUNTED DOCKING STATION

PARTIALLY DOCKED TASK TRAY

PARTIALLY DOCKED TASK TRAY

901
WALL MOUNTED DOCKING STATION

DOCKED TASK TRAY

DOCKED TASK TRAY

TRAY WITH VARIABLE POSITIONING AND SUPPORT

CROSS-REFERENCE TO RELATED APPLICATIONS

This application is a national phase application pursuant to 35 U.S.C. § 371 of International Application No. PCT/US2018/062929 filed Nov. 28, 2018, which claims priority to U.S. Provisional Patent Application Ser. No. 62/591,728 filed Nov. 28, 2017, the disclosures of which are incorporated by reference herein.

TECHNICAL FIELD

A chair with seating surfaces that can flex to conform to the shape and weight of an occupant, and in particular to a chair capable of providing an occupant the ability to achieve a recumbent position that disperses their weight to reduce point loading on certain areas or body parts of an occupant.

BACKGROUND

Typical chairs are configured to contort an occupant into positions that put pressure on the spine or specific portions of the spine. This can cause discomfort or pain and over time lead to chronic conditions. In order to reduce discomfort and pain, designers have introduced ergonomic chairs that purport to provide support for the lower back and promote good posture. However, ergonomic chairs do not evenly distribute body weight resulting in point loading on a body of an occupant. There therefore exists a need for a chair that conforms to an occupant's body shape and weight, with a form that reduces point loading on an occupant's body and minimizes internal stresses and compressions on body parts of the occupant, such as the spine and neck.

SUMMARY

A chair including a frame that can be adjusted to meet ergonomic needs of occupants. A chair can include a seating surface or combination of seating surfaces capable of flexing or otherwise deforming to conform to a weight and shape of an occupants body and specific parts of the occupant's body. In various implementations, a chair can be configured to provide an occupant the ability to achieve recumbent positions while dispersing a weight of the occupant or specific body parts of an occupant to reduce point loading. Further, in various implementations, a chair can be configured to allow an occupant to achieve a recumbent position while reducing physiological stresses and compressions on body parts of the occupant, such as the occupants neck, back, or spine.

In various implementations, a chair includes a structural frame. The structural frame of the chair can be of a shape or design to allow an occupant to achieve a recumbent position. A structural frame of the chair can include front and rear frame elements. Additionally the structural frame of the chair can include a support assembly structurally coupling the front and rear frame elements to each other, The support assembly can include one or a plurality of support sub frames and support wheels. The chair can also include a back support, one or a plurality of seating surfaces, a rotating headrest, and a rotating footrest. The various elements previously described can include mechanical and/or electrical connections coupling the elements and components together for allowing the elements and components to displace or rotate through ranges of motion. By allowing the components and elements to displace or rotate through ranges of motion, the connections allow for the form of the chair to be adjusted, providing more customized support for individual occupants, thereby potentially leading to reductions in point loading on an occupant.

In various implementations, a chair can include frame elements as part of a structural frame. Further, in various implementations, a force generating mechanism, such as a mechanized ring rotation assembly, can be integrated or physical coupled to the structural frame to cause displacement or rotation of elements of the structural frame, thereby allowing adjustment of the positions of components of the chair. For example, either or both the front and read frame elements may be rotated along various axes or displaced along planes to provide adjustment of a seat angle, a seat height, or an overall length of a chair. In various implementations, adjustments to elements of the structural frame, e.g. the front and rear frame element, can be made manually by an operator absent use of a motor assembly or other force generating mechanism.

In various implementations, a chair can have one or more bladders. Bladders of a chair can be configured to provide structural support and are configured to be filled or defiled with a suitable gas. Further in various implementations, hairs can be coupled to a canopy and canopy support arms to provide shade or protection from the elements for an occupant. Additionally, a canopy and canopy support arms can be coupled to the chair and used to private varying degrees of privacy to an occupant.

In various implementations, chairs can be coupled to a display tray and display support arms. Further, in various implementations, chairs can include one or a plurality of utility shelfs or storage compartments.

In various implementations, an apparatus comprises a tray including a plurality of radial openings. An inner tray support and an outer tray support may be connected to the tray using a fixed connection that allows the tray to pivot within the inner tray support and the outer tray support. A spring-tensioned ball catch may be configured to provide the tray a slip-locking connection through the plurality of radial openings of the tray that allows the tray to be rotationally adjusted within the inner tray support and the outer tray support.

In various implementations, an apparatus comprises a tray including a plurality of radial openings. An inner tray support and an outer tray support may be connected to the tray using a fixed connection that allows the tray to pivot within the inner tray support and the outer tray support. One or more interior tabs may be configured to disengage one or more tray-support-mounted plungers from the plurality of radial openings of the tray, thereby allowing the tray to be rotationally adjusted within the inner tray support and the outer tray support.

DETAILED DESCRIPTION

Figure 1:
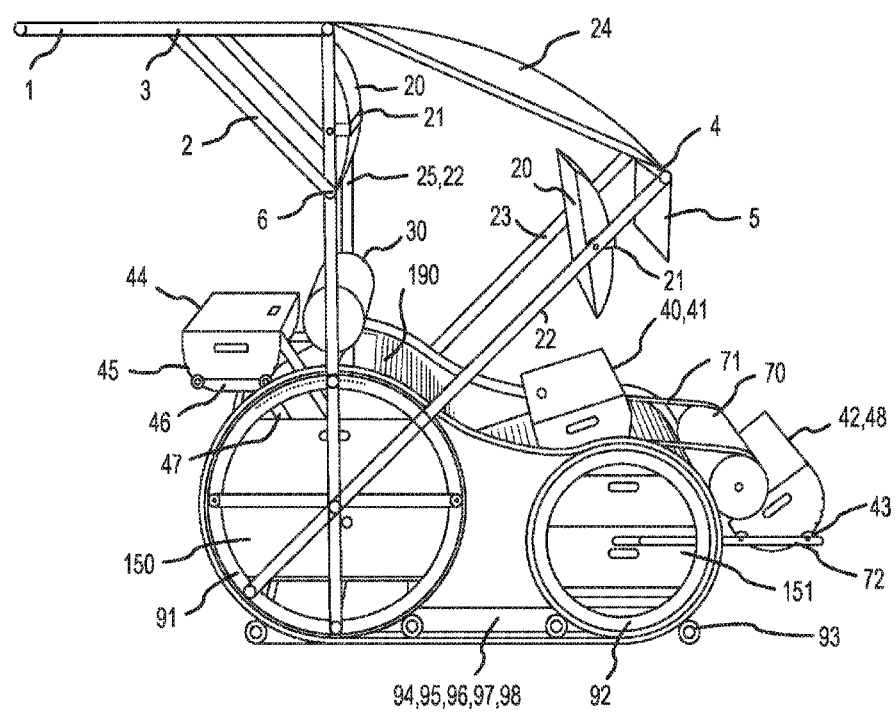
FIG. 1 provides a side view of a chair.
Figure 2:
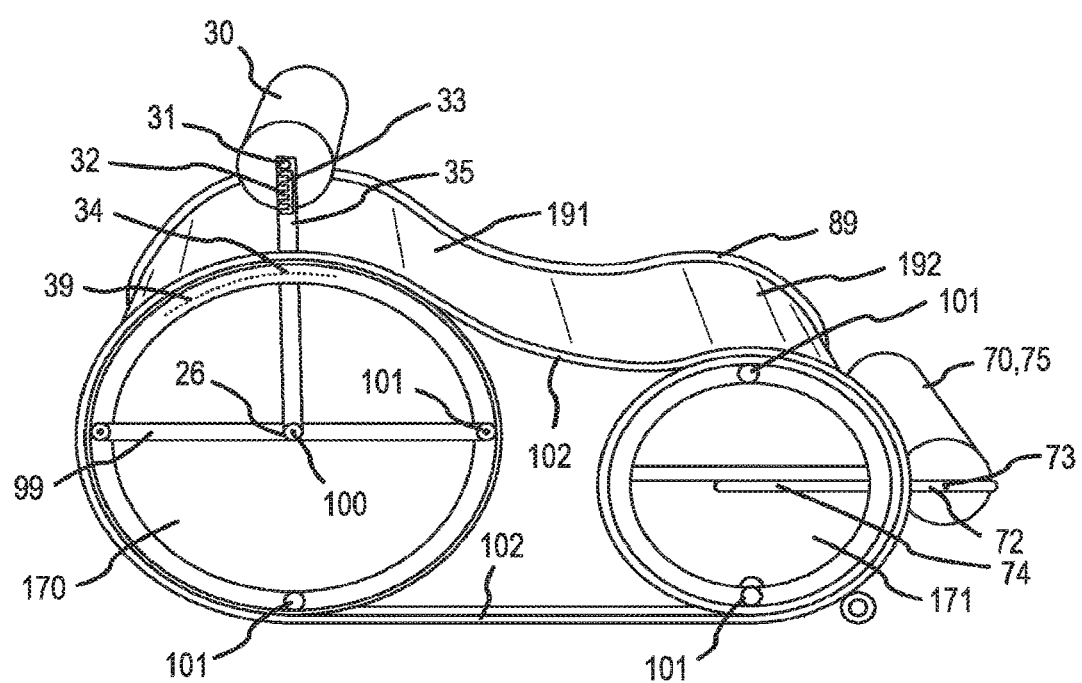
FIG. 2 provides another side view of a chair.

FIGS. 1 and 2 provide depictions of a chair configured to allow an occupant to achieve a recumbent position while reducing point loading of an occupant of the chair. The chair comprises a structural frame, a back surface, and a seating surface. The chair frame along with a back and seating surfaces capable of flexing according to characteristics of an occupant, e.g. a height of an occupant, a weight of an occupant, movements of an occupant, shape of an occupant. Depending upon implementation-specific or other considerations, elements of the chair, e.g. elements include as part of the structural frame, can flex, deform, displace, or rotate to cause the chair to conform to a shape, weight and movement of an occupant and allow for the occupant to achieve a recumbent position. For example, a rear frame element (91) and a front frame element (92) can rotate to allow an occupant to achieve a recumbent position. In another example, a rear bladder (170) can deform under the weight of an occupant to reduce physiological point loading to reduce internal physiological stresses such as neck/back vertebral compression.

The structural frame includes a rear frame element (91) and a front frame element (92). The rear frame element (91) and the front frame element (92) can be comprised of an applicable material to provide structural integrity to the structural frame and allow the structural frame to support an occupant of the chair. For example, the rear frame element (91) and the front frame element (92) can be comprised of a metal, such as steel, carbon fiber, or an applicable composite material. Depending upon implementation-specific or other considerations, the structural frame can include one or an applicable combination of a support assembly (94), support sub frames (95), support wheels (96), bottom support structures (97) cross support structures (98), axial cross support structure (100), and side support structures (102). In various implementations, the support sub frames (95) can be rigidly secured or configured to displace. For example the support sub frames (95) can be of an applicable material or design to allow for deformation or rotational movement of frame elements of the structural frame. The axial cross support structure (100) can function to support other components and allow the other components to be fixed and/or displace or rotate. A chair can include a rear frame element support (99) (FIG. 2).

In a specific implementation, a rear frame element support (99) provides support for rear element frame pivoting support arms and/or springs (e.g. headrest supports, utility shelf supports and canopy supports). For example, the rear frame element support (99) can be rigidly coupled to the rear frame element coupled to a canopy support to cause or allow the canopy support to rotate or displace with the rear frame element support (99). Frame coupling mechanisms (101) (FIG. 2) are employed as connectors for the various structural elements of the frame elements of the chair. Depending upon implementation, specific or other considerations, the frame coupling mechanisms (101) are of an applicable type to allow frame elements coupled by the frame coupling mechanism to rotate or otherwise displace with respect to each other. Further depending upon implementation-specific or other considerations, the frame coupling mechanisms (101) are of an applicable type to rigidly secure frame elements together in a fixed manner.

In a specific implementation, the frame elements can be tubular, flat, and/or curved angled members which may utilize standard or custom punch hole patterns. In FIG. 2, an example punch hole pattern (39) is shown along a portion of the rear element frame which can provide for necessary material connections along with anchoring sites for applicable frame elements of the structural frame. For example, punch holes in the punch hole pattern (39) can be used to couple a display support arm to the rear element frame (91).

In a specific implementation, the side support structures (102) function to couple the rear frame element (91) and the front frame element (92). Depending upon implementation-specific or other considerations, in coupling the rear frame element (91) to the front frame element (92), the side support structures (102) can help in structurally solidifying the structural frame of the chair to support an occupant of the chair. For example, in coupling the rear frame element (91) to the front frame element (92), the side support structures (102) can prevent unwanted displacement of the rear frame element (91) away from the front frame element (92). Further depending upon implementation-specific or other considerations, the side support structures (102) can provide structural rigidity and/or overall support to the structural frame. For example, the side support structures (102) can provide the structural frame strength to support a weight of an occupant. The side support structures (102) can be comprised of an applicable material or combination of materials to provide structural integrity to the structural frame, such as wood, plastic, metal, or any other applicable material or combination of materials.

In a specific implementation, the front (92) and rear (91) frame elements can be coupled to each other, at least in part, through the bottom support structures (97), as is shown in FIG. 1. Cross support structures (98) can couple corresponding rear frame elements (91), front frame elements (92), and side support structures (102) on opposing sides of the frame structure of the chair.

In a specific implementation, a structural perimeter or portions of the structural perimeter of rear frame elements (91), front frame elements (92), and side support structures (102)can be lined in the vertical and/or long axis with a rail (89). Depending upon implementation-specific or other considerations, the rail 89 can function as arm rests (FIG. 2). Further depending upon implementation-specific or other considerations, the rail 89 can function to protect an occupant from the structural frame and provide overall comfort to the occupant. The rail (89) can be comprised of an applicable material capable of conforming to geometric shapes of the structural frame, while meeting performance requirements of the chair in allowing an occupant to achieve a recumbent position. For example, the rail (89) can be comprised of a flexible padded material.

As alternatives to fixed connections, the chair may utilize adjustable connections, such as eccentric connections, that may be provided to connect various chair elements and chair structural elements. By using eccentric connections, the connected elements can move relative to one another, and to the rest of the chair, through a range of motion. For example, using the adjustable connections enables variations to the seat angle, seat length, and seat height (variations in adjustability may be based on the eccentricity of one specific bolt length and subject to customization) and the seat's relation to both the back and forward leg support surfaces. The frame coupling mechanisms can be applicable mechanism for structurally coupling frame elements to each other, such as eccentric bolt connections.

As discussed previously, in a specific implementation, the frame structure includes bottom support structures (97) can be configured to extend between opposing sides of the chair or structural frame. For example, the frame structure can include bottom support structures (97) extending parallel to a traverse axis of the frame structure. Depending upon implementation-specific or other considerations, the bottom support structures (97) can be connected via a structural plate on each side of the chair or integrated with a structural plate to form a rail/plate component coupling the rear frame element (91) to the front frame element (92). For example, the bottom support structures (97) can be connected to a structural plate integrated as part of the side support structures (102).

In a specific implementation, the frame elements (91) and (92) of the frame structure are configured to directly contact a surface supporting the chair. For example, two rear element frames (91) and two front element frames (92) can sit directly on a surface supporting the chair or on bottom rails, potentially integrated as part of the chair and sitting directly on the surface supporting the chair Additionally, in a specific implementation, one or an applicable combination of frame elements (91) and (92) can engage or otherwise contact smaller support wheels (96). The support wheels (96) capable of engaging the frame elements (91) and (92) can be fixed or rotatable. Additionally, the support wheels (96) can be affixed to structural support rails included as part of the structural frame on respective sides of the structural frame. In being rotatable, the support wheels may act as bearings, and assist in providing smooth and easy rotation of the frame elements (91) and (92). This can lead to a reduction in force required to rotate or otherwise displace the frame elements (91) and (92). The frame elements (91) and (92) may be connected to a structural rail at the bottom of each ring with rotating frame coupling mechanisms.

Figure 5:
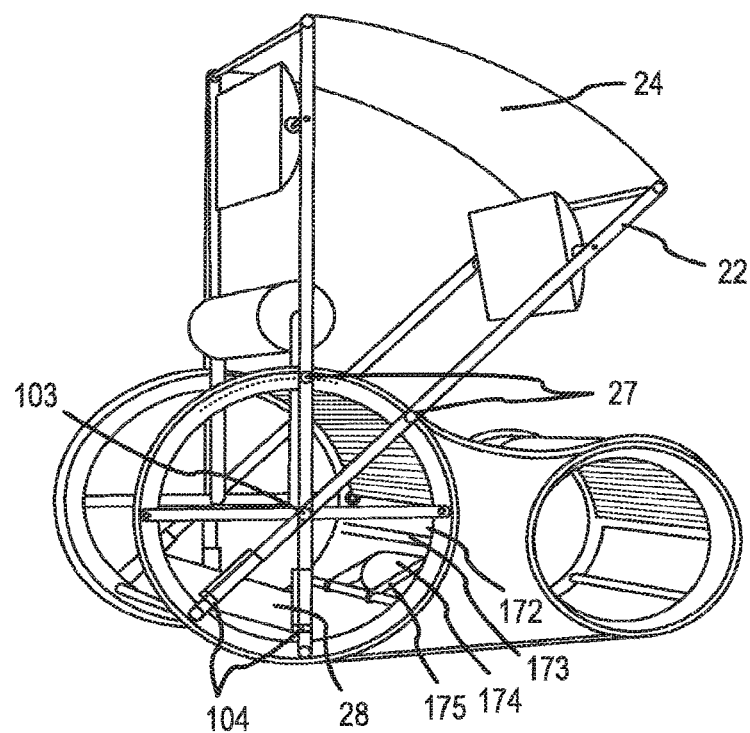
FIG. 5 provides a side perspective view of a chair.
Figure 6:
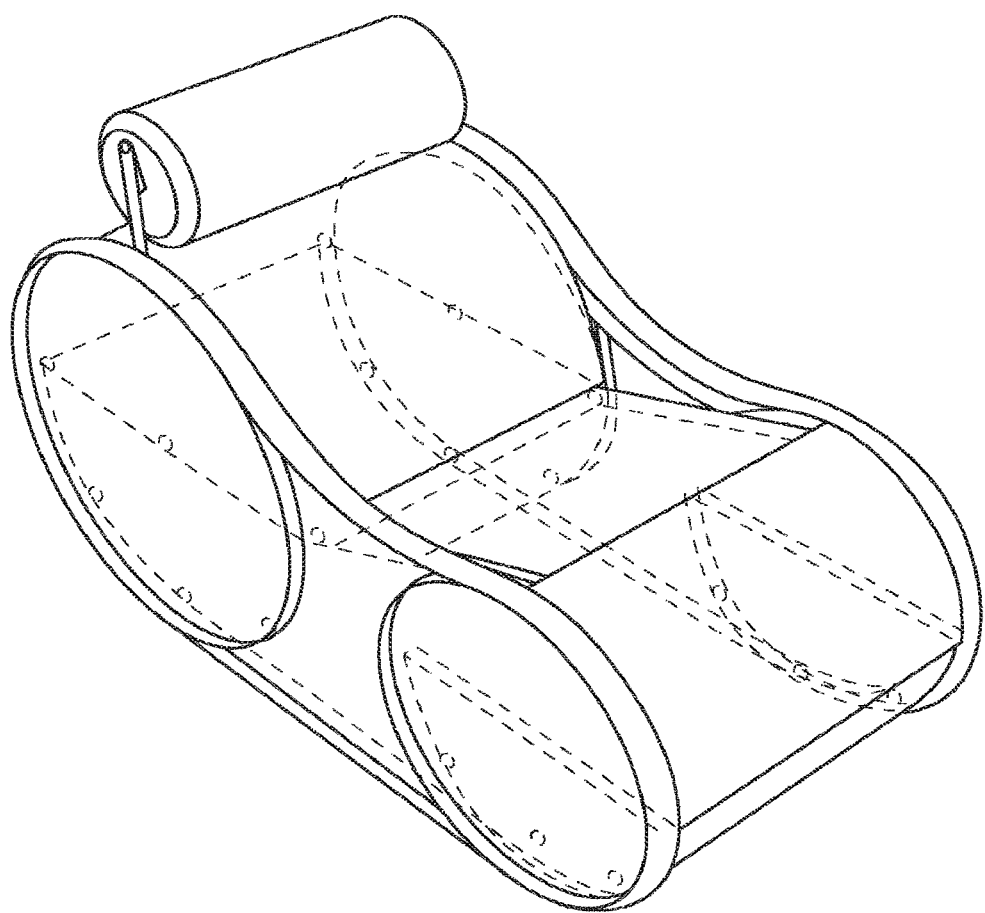
FIG. 6 provides a top perspective view of a chair.

In a specific implementation, the frame elements (91) and (92) can be rotated along a rotational angle of the frame elements (91) and (92) around a central axis of one or a plurality of the frame elements (91) and (92). In various implementations, the frame elements can be rotated in response to mechanical energy provided by mechanical motors. Each frame element (91) and (92) can have a single mechanical motor only dedicated to each corresponding frame elements (91) and (92), or share mechanical motors amongst a combination of frame elements (91) and (92). Depending upon implementation-specific or other considerations, mechanical motors can move in unison or independently to provide a wide range of automated or programmable synchronized and non-synchronized movement patterns of the corresponding frame elements (91) and (92) the corresponding mechanical motors control. Motor activation of the mechanical motors can be controlled by a programmable and repositionable remote control. Each frame element (91) and (92) may be connected to the motor with a motor gear arm (175) (FIG. 5). Depending upon implementation-specific or other considerations, one or more manual levers or drive arms (not shown) may be provided instead of the mechanical motors, to allow an occupant of the chair to manually change the seat angle, height, and length, as well as adjust the positioning of other components of the chair or structural frame, e.g. the rear and front element frames (91) and (92).

Back support and Seating Surfaces

The chair includes back support and seating surfaces configured to receive an occupant of the chair and support an occupant of the chair as the occupant utilizes the chair. Back support and seating surfaces can be comprised of a cushioned layer housed within a fabric cover and a supported by a seating support structure (190) as shown in FIG. 1. The seating support structure can include a back support surface (191) and a seating surface (192). The seating support structure (190) can be comprised of one of a plurality of flexible materials, such as bungees or flexible fabrics. The seating support structure (190) can be anchored to the frame elements (91) and (92). The seating support structure (190) can also be anchored to the side support structures (102), or other structural supports provided with the structural frame. In various implementations, the back support surface (191) and seating surface (192) can be located between the side support structures (102) and run from near the top of the rear frame element (91) to the front midpoint of the front frame element (92). Depending upon implementation-specific or other considerations, a middle section of the seating support structure (190) can be structurally supported by ("seat stays") which are independent structural members that are attached on each side to the top interior of the front frame element (92) and the forward midpoint of the rear frame element (91). In various implementations, the independent structural members can be affixed to the frame elements (91) and (92) with adjustable connections, such as rotating frame coupling mechanisms.

Headrest

In various implementations, the chair includes a headrest. Depending upon implementation, specific or other considerations, a headrest included as part of the chair can be a rotating headrest. For example, a headrest can rotate about a central axis of the headrest as an occupant reclines into a recumbent position.

In a specific implementation, the headrest is supported by a headrest support. The headrest support can include headrest support arms (35). The headrest support arms (35) can include stepped notches (32). Depending upon implementation-specific or other considerations, the stepped notches (32) can provide for radial and/or height adjustments of the headrest. For example, an occupant can adjust the height of the headrest with respect to the chair such that the headrest adequately supports the head of the occupant. In various implementations, the stepped notches (32) can be used to displace a headrest support rod (202) through a shared channel (33) within each support arm (35) to cause the headrest to displace. For example, a headrest support rod (202) can be moved away from the chair within the shared channel (33) to cause the headrest to be raised to accommodate a height of an occupant. In various implementations, the headrest support arms (35) can include a plurality of discontinuous individual apertures that are not connected through a channel. For example, the headrest can be disconnected from the headrest support arms (35) and subsequently recoupled to at least one of the plurality of discontinuous individual apertures to displace the headrest and subsequently adjust the height of the headrest with respect to the chair.

In a specific implementation, the headrest can be coupled to the headrest support arms (35) through spring loaded mechanisms. For example, the headrest support rod (202) can be coupled to the stepped notches (32) through a spring loaded mechanism, thereby allowing the headrest support rod (202) and subsequently the headrest to be displaced more easily within the shared channel (33).

In various implementations, the headrest includes a headrest sub-assembly. The headrest sub-assembly can include a spring-tensioned assembly including radial spring cap plates on either side and radial spring anchoring disks, specifically 207, 206, 204, 211. The previously described components, as part of the headrest sub-assembly, can be implemented with the headrest support rod (202) and functions to provide support of the headrest. Additionally, the previously described components alone in combination with the headrest support rod (202) can function to secure the headrest to the headrest support arm or arms (35). Depending upon implementation-specific or other considerations, tensioning the headrest assembly can be increased or decreased to accommodate varying levels of pre-tensioning to resist specific or range of head or neck pressures. This provides an occupant of the chair with the ability to incrementally reposition the headrest, dynamically reposition the headrest, and/or reposition the headrest without using their hands, potentially when seated in the chair. In various implementations, adjustments of the tensioning of the headrest sub-assembly can be executed by rotating the headrest to provide for incremental increases or decreases in the spring tensioning.

In a specific implementation, the headrest sub-assembly includes one or an applicable combination of friction, pre-tensioned spring, spring pin, mechanical, eccentric connection elements configured to allow the headrest cushion and immediate substrate supports to move independent of the fixed support on which they are housed. For example, using the previously mentioned components, the headrest cushion, and potentially other components of the headrest sub-assembly can move independently of the headrest support rod (202) while it is affixed to the headrest support arms (35). Depending upon implementation-specific or other considerations, the previously described components can allow the headrest cushion to move in a limited range of motion in specific directions. For example, the headrest cushion can be displaced in a range of motion that is primarily co-planar with the long axis of the chair or along other axes.

Figure 4:
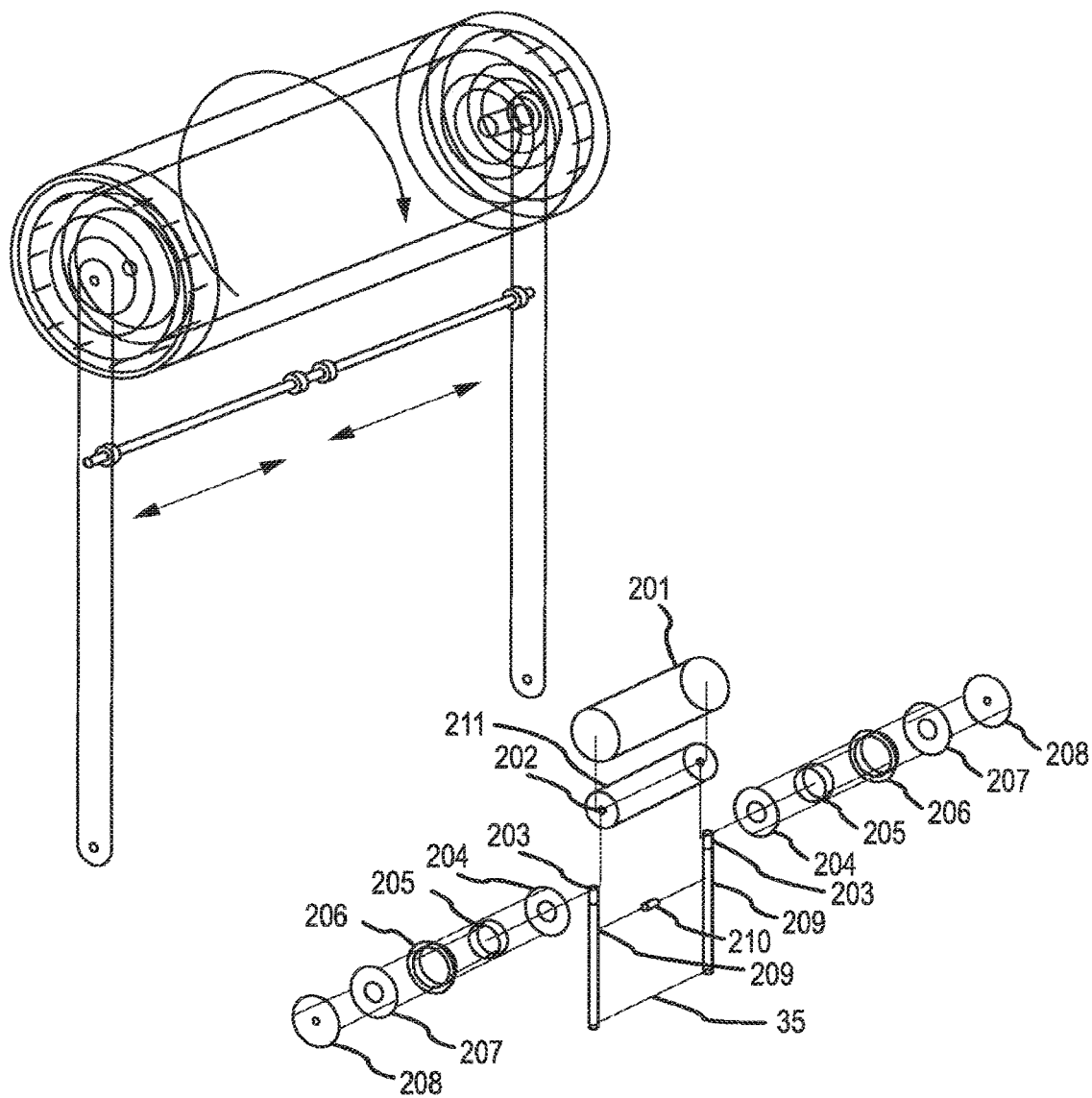
FIG. 4 provides an exploded perspective view of a headrest and headrest cushion assembly.

FIG. 4 provides an exploded view of a headrest. The headrest includes a headrest cushion, a fabric enclosed cushion (201), a headrest support rod (202), and a headrest sub-assembly. In various implementations, the spring-tensioned assembly (207), (206), (204), (211), (201) is a rotationally adjustable spring-tensioned system that can be configured to allow the headrest cushion to move independently of the headrest support arms (35). For example, the spring-tensioned assembly can be configured to allow the headrest cushion to move in a direction that is co-planar to the longitudinal axis of the chair. The radial springs (205) can be anchored to a disk (206) that is fixed to the headrest support rod (202) within the radially stepped spring tensioning disks (206). These components can be enclosed by cap plates (204 and 207). The radial spring cap plates (204 and 207) can be coupled to the structural headrest cushion core (211). In various implementations, the radial spring cap plates (204 and 207) can be configured to move in a range of motion within the headrest. As the headrest is rotated, the radial springs can be tensioned to produce a range of force resistance that resets and repeats in sequential steps sequentially. The spring-tensioned assembly includes plates (208) at opposing ends. The plates (208) can functions to secure the various components of the spring-tensioned assembly together and prevent foreign substances from entering the spring-tensioned assembly.

In a specific implementations, the headrest support arms (35) includes the spring pin plungers (209). The spring pin plungers 209 can be configured to allow for radial repositioning of the headrest support arms (35) in relation to the rear frame element (91). The extended spring pin plungers (209) can allow for adjustments of the headrest by an occupant. The spring-tensioned assembly can include a spacer or one way bearing which can be used in conjunction with application coupling mechanisms to couple the headrest to the headrest support arms (35).

As shown in FIG. 1, the headrest support arms (35) are anchored to and pivot at, around, or through a rear frame element support (99) that connects to and spans a midpoint of the rear structural frame. The support arms (35) can rotate from this centered pivoting connection to allow the headrest assembly to also rotate in unison along the radius of the rear frame element and/or along the longitudinal axis of the chair.

A headrest coupling mechanism (31) couples the headrest to the headrest support arms (35). Depending upon implementation-specific or other considerations, the headrest coupling mechanism (31) can be an applicable mechanism that allows the headrest assembly to rotate in unison in a forward/rear motion and/or independently from the rotation of the headrest support arms (35). A plunger (34) can be configured to allow for quick radial adjustment of the headrest support arms (35).

Leg and Foot Support Elements

FIGS. 1 and 2 provide a depiction of a leg and foot support elements integrated with the chair. In a specific implementation, the leg and foot support elements are integrated at the front of the chair and may provide additional leg cushioning and footrest support. Depending upon implementation-specific or other considerations, the leg and foot support elements can be fixed or adjustable. For example, the foot support element can be adjusted to accommodate occupants of varying heights. The supports may be comprised of a solid, cushioned, inflatable material or any combination of surfaces that adjust uniformly or independently in any direction. Further depending upon implementation-specific or other considerations, the foot and leg supports may be configured to be adjustable to allow for storing or stowing within the frame structure of the chair. The foot and leg supports can be coupled to the chair through an applicable coupling mechanism. For example, the foot and leg supports can be coupled to the chair through adjustable pivoting connections that provide adjustability of the leg and foot supports while an occupant is either in a seated or standing position. In another example, the leg and foot supports can be coupled to the chair through one or an applicable combination of spring tensioned, spring pinned, ratcheting, mechanical, hook, bungee or eccentric connections.

In a specific implementations, as shown in FIG. 1, a lower body support element (70) is coupled to the chair through adjustable straps (71). The lower body support element can serve as a leg support and/or a foot support in operation of the chair.

In a specific implementation, as shown in FIG. 2, a lower body support element (70) can be coupled to the chair through footrest support arms (72) in an extended position. A connector, such as a nested footrest pin is attached to the sides of the footrest cushion/support and allows the support arms (72) to nest into the support arms (73), thereby displacing the lower body support element (70)

In a specific implementation, the chair includes a removable storage container (74). The removable storage container 74 can be integrated as part of the chair and allows for an occupant to store items within the chair.

Bladders

In a specific implementation, the interior of the chair may comprise inflatable bladders, along with mechanisms for inflating and deflating the bladders. For example, the interior of the chair can include an air pump and hose assemblies to selectively inflate or deflate the bladders to an occupant's preferences. Alternatively, an air pump and hose assembly can be, at least in part, integrated externally from the chair. The bladders can include sealable connections thereon for attaching air hoses and other devices to inflate or deflate the bladders. Each bladder can be formed of one large bladder, or can be comprised of a series of smaller bladders formed together in compartments. Depending upon implementation-specific or other considerations, gas hose connections can be made to each bladder, or series of compartments making up the bladders. Further depending upon implementation-specific or other considerations, the bladders can include connections for attachment of external hoses for use in inflating and deflating the bladders.

In a specific implementation, as shown in FIG. 2, a series of bladders may be integrated within the structural frame, and below the back and seating surfaces. For example, the chair can include a rear bladder (170) housed within a cavity of the rear frame element (91). In another example, the chair can include a front bladder housed within a cavity of the front frame element (92). Depending upon implementation-specific or other considerations, the chair can include bladders between the area of the rear and front support elements (91 and 92). For example, the chair can include a bladder underneath the back support surface (191).

In a specific implementation, gas pressure within the bladders can be regulated manually or by a pump and/or regulator assembly. The ability to control gas pressure within the bladders allows an occupant to inflate and deflate different bladders to different pressure levels according to the desired comforts of the occupant. In a specific implementation gas pressure levels of the bladders can be controlled manually or according to customizable and/or programmable pressure variations. For example, smaller bladders lining the back and seat surface cushions can be configured to provide more targeted pressurization variations. In providing targeted pressurization variations, fatal infections from the development of undetected sores as a result of paraplegia can be prevented.

In a specific implementation, as shown in FIG. 5, the pump/regulator assembly (172), hoses (173) can be contained within the interior of the chair frame structure.

In a specific implementation, as shown in FIG. 5 the chair includes a motor assembly (14) and a motor gear arm (175). The motor gear arm (175) can regulate displacement or rotation of the rear and front frame elements (91 and 92) in response to energy provided by the motor assembly (14). Additionally, the motor gear arm (175) can regulate movement of the structural seat stays and seating surfaces through a range of motion in providing various seating positions for occupants.

Utility Shelf

In a specific implementation, a chair can include a utility shelf (40). Examples of a chair integrated with a utility shelf are shown in FIGS. 1, 3A, 3B, and 3C. The utility shelf (40) can be adjustable. Depending upon implementation-specific or other considerations, the utility shelf (40) can be fixed to, nested within, or independent of fixed components of the chair. The utility shelf (40) can be used to provide task specific surface areas and storage for the user while in both the seated and standing position. Further depending upon implementation-specific or other considerations, the shelf (40) can be detachable from the chair.

Figure 3A:
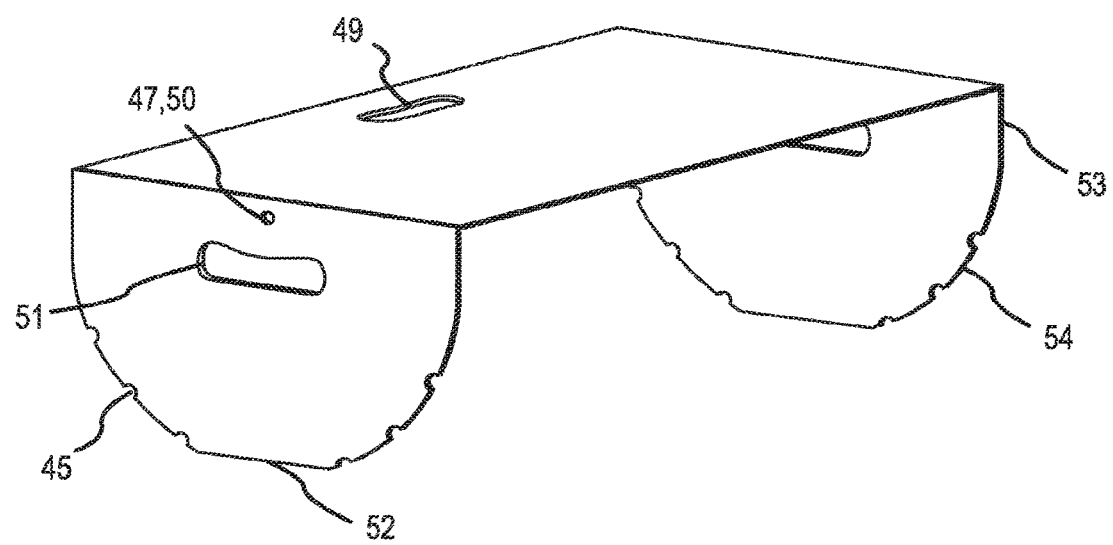
FIG. 3A provides a side perspective view of a utility shelf.
Figure 3B:
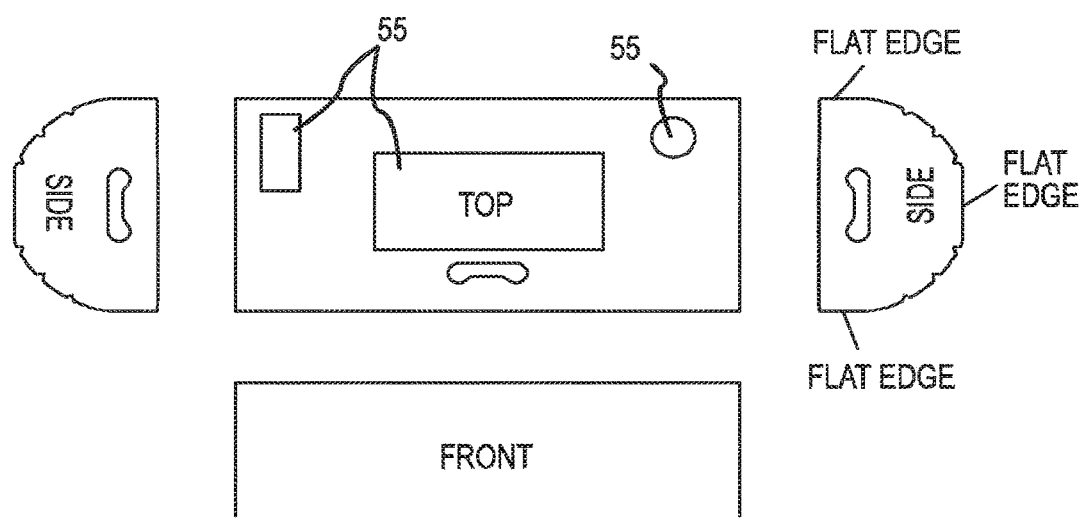
FIG. 3B provides a top view of parts of a utility shelf.
Figure 3C:
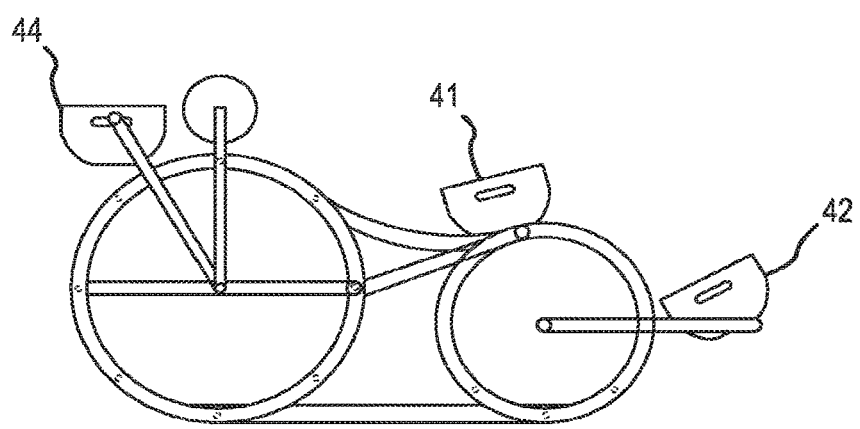
FIG. 3C shows a side view of a chair with an integrated utility shelf configured at three different positions.

FIGS. 1 and 3c show a utility shelf in 3 different positions: behind the headrest in a rear non-rotated position (44); positioned for use as a lower body support element (42); and nested in a rotated seat position (40). Depending upon implementation-specific or other considerations, as shown in FIG. 1, a utility shelf can be coupled to the chair through fixed utility shelf support arms (46). Alternatively, a utility shelf can be coupled to the chair through rotating utility shelf support arms (47), to allow for the utility shelf to be rotated into various positions.

In a specific implementation, a shelf may be comprised of a surface that acts as support legs on each side and incorporates radial edges (54) (FIG. 3a). This can facilitate the rotation of a task surface provided by the shelf. Additionally, this can provide customizable task surface angles while in the fixed, nested or independent configuration. The utility shelf can include radial notches (45) (FIG. 3a) along the radial edges (54). The radial notches (45) can be used to lock the shelf at predetermined angles. The radial notches (45) can also include an additional slot along a smaller diameter in which the utility shelf can be rotated. The shelf can be locked in a position by an applicable mechanical mechanism, e.g. friction, spring-tensioned pin, mechanical, magnetic or an applicable combination thereof. In providing for task surface adjustments a variety of task specific activities such as reading, writing, typing, or eating angles can be achieved. The utility shelf can be used independently to carry or stow accessories or for use while the user is seated on any surface.

In a specific implementation, between the radial notches 54, the shelf includes flat edges (53) (FIG. 3a). The flat edges (53) can allow the shelf to be stowed on a side edge or placed on the floor from a seated position in conjunction with a single hand grip.

In a specific implementation, the shelf includes a flat surface (52) on the bottom. The flat surface (52) can be used place and balance the shelf on a flat surface independently.

In a specific implementation, the shelf includes recesses and/or embossed surfaces. The recesses and/or embossed surface can be configured for providing anchoring connections, hand and/or finger grips or used for the nesting of task specific accessories (beverage, keyboard, mouse, remote controls, etc.). These recesses and/or embossed surfaces may be on an applicable surface of the shelf and utilize magnetic or mechanically fastened connections. Side openings (51) on sides of the shelf provide grips for use in carrying or otherwise displacing the shelf. Additional surfaces or containers may be attached to the tray to expand the task specific surface area of the shelf or to provide additional storage. These surfaces may be nested on top of the shelf surface, hinged, inserted or fastened to any shelf surface and utilize magnetic or mechanically fastened connections. Non-slip surface textures may also be fabricated as part of the shelf or affixed to the shelf in the form of a non-slip coating or veneer to any shelf surface.

In a specific implementation, as shown in FIG. 3A, the utility shelf can include a top opening (49). Through the top opening (49), an operator can carry the shelf. Additionally, in a specific implementation, the utility shelf can include through holes (50) for anchoring the shelf to utility shelf support arms.

Display Tray and Display Supports

FIGS. 1 and 5 illustrate a display tray (20) with display support arm assemblies that allow adjustable connection to the chair. Depending upon implementation-specific or other considerations, the display tray (20) can be a physical surface for supporting or resting an item such as a lap top, note pad, book or what not. Further depending upon implementation-specific or other considerations, the display tray (20) can be integrated as or include a visual computer display, e.g. a computer monitor. For example, the display tray (20) can be an actual electronic pad, e.g. an iPad®.

In a specific implementation, the display tray is integrated with a tray support assembly that can provides a wide range of independent height and rotational angle configurations for both the display tray to accommodate preferences of an occupant. The display tray can be integrated with display support arms (22). The display support arms can be displaceable or rotatable to provide fixed or adjustable positioning of the display tray to suit the preferences of an occupant.

The display supports arms (22) can be configured to extend from the chair structural frame. Alternatively, the display support arms (22) can be configured to pivot from fixed connections on the chair. Depending upon implementation-specific or other considerations, the display support arms (22) can be configured to operate with display support arm guide wheels (27) (FIG. 5). The display support arm guide wheels (55) can be coupled to the display support arms (22) in a configuration including a flange that can function to stabilize lateral and rotational movement of the display support arms (22). Further depending upon implantation-specific or other considerations, the display support arm guide wheels (22) can move over small protrusions on the interior of the rear frame element (91). The small protrusions function to prevent rolling of the display support arm guide wheels (22) and subsequent displacement of the display support arms (22) and the display tray (20). One or a combination of the display support arms (22) the display support arm guide wheels can be housed within a covering that extends out from the sides of the chair.

In a specific implementation, display support arms (22) are coupled to the chair through applicable pivoting coupling mechanisms, e.g. a rotating pin. In using a pivoting coupling mechanism a range of adjustments for positioning the display tray 20 using the same pivoting support arms is achieved. FIGS. 1 and 5 show the display tray (20) range of motion (24) provided by the display support arms (22). For example, the display support arms (22) may be in an angled position (23), or in a vertical position (25). The display tray support arms (22) may also be set to any other position within their range of motion.

In a specific implementation, the tray support assembly includes display support arm connector (21). The display support arm connector (21) can couple the display tray (20) to the display support arms (22). Depending upon implementation-specific or other considerations, the display support arm connector (21) can be a pivoting connection, e.g. a pin, which allows the display tray (20) to be rotated/tilted. The display support arms (22) and display support connector arm (21) can include spring tensioning, spring tensioned pins, counterweights, mechanical fastening, magnetic connections, friction connections or any combination thereof to assist in positioning and repositioning of the display tray (20) and display support arms (22). Depending upon implementation-specific or other considerations, the tray support assembly can include display mounting plates that comprise the display bracket assembly may also be fixed, removable, slide, slip-lock, lock, pivot, rotate, clamp or of any combination in how they connect to the display support arms. These connections can allow the display bracket support arms (22) to be adjusted to provide the ability to adjust and set the display tray at various rotated positions.

In a specific implementation, a base of the display support arms (22) are weighted with a counterweight (28) to counterbalance the weight of the display tray or for example, the weight of a computer/monitor, or other device or item placed on the display tray. This can ensure that the display tray 20 be easily moved to a desired a position and help to keep the display tray at the desired position.

The display support arms (22) can be centered and fixed to torsion springs (26) (FIG. 1) on the rear frame element support (99) attached to the rear frame element. At the base of each support there can be a tensioned wheel assembly (104). Tension within the tensioned wheel assembly (104) can be generated by an applicable mechanism for generating energy, such as a spring. The tensioned wheel assembly (104) can be adjusted to a range of tension to help regulate the rotation of the display support arms in conjunction with and nesting between the small protrusions along the interior of the frame elements (91). This can be used to provides rotational reposition of the display tray (20) and the display support arms (22) from both a standing or seated position.

As shown in FIG. 5, a torsion spring (103) provides rotational resistance of the display tray and display support arms. It is connected to the rear frame element support (99) and the display support arm on either side of the chair and can be configured to perform in either rotational direction.

Canopy and Canopy Supports

In a specific implementations, the chair includes a canopy enclosure supported by a canopy support structure. The chair can include a canopy enclosure having a canopy shade (5) and canopy support arms (1) included as part of the canopy support structure as is shown in FIG. 1. A canopy enclosure can be included on the chair to provide shelter from environmental impacts when the chair is in use outdoors or for varying levels of privacy. The canopy shade (5) can be comprised of an applicable material or combination of materials. For example, the canopy shade (5) can be comprised on an applicable materials or combination of materials that assist in mitigating environmental impacts such as sun, rain, wind, sound or insects.

In a specific implementation, the canopy support arms (1) may provide fixed or adjustable positions for the canopy shade (5) to suit the comfort preferences of each occupant. Not shown are independent vertical canopy support arms. Depending upon implementation-specific or other considerations, as shown in FIGS. 1 and 5, the display support arms (22) can function as vertical canopy support arms.

In a specific implementation, the chair can include canopy support arms (1) separate from the display support arms (22). The independent canopy support arms (1) can be fixed to the chair frame or alternatively, pivot from fixed connections on the chair similar to the display support arms (22). In using canopy support arms independent from the display support arms (22) the display tray and display support arms can rotate freely within the canopy enclosure to accommodate seated and standing positions. The canopy support arms (1) can be coupled to the chair through a pivoting connection to provide for a range of adjustments that include positioning for both a seated and standing configuration independent of the pivoting display support arms (22). Depending upon implementation-specific or other considerations, the canopy support arms (1) can include or be coupled to spring tensioning, spring tensioned pins, counterweights, mechanical fastening, magnetic, friction connections or any combination to assist in the positioning and repositioning of the canopy enclosure.

In a specific implementation, the chair includes canopy support brackets (2) to aid in supporting the canopy support arms(1). Depending upon implementation-specific or other considerations, the canopy support brackets can be coupled to the canopy support arms (1) through an applicable coupling mechanism, e.g. a fixed or pivoting coupling mechanism. The canopy and associated canopy support structure can be removable from the chair. The chair can include a spring pined/plunger (6) to allow for quick releases of connections of either or both the canopy support arms (1) from the chair and/or the canopy brackets (5) to decouple the various components of the canopy and the canopy support structure.

As shown in FIG. 1 the canopy support brackets (2) may be hinged and pinned so they can be stowed with the canopy support arms (1). The canopy support structure can also include a canopy structural cross support (4). In various implementations, a plurality of canopy structural cross supports may be included as part of the canopy support structure. A material forming the canopy can be attached to the canopy cross support (4) and can be spring-loaded and deployed or stored in place with a pull release or pull locking mechanism.

Internal Storage Compartments

In a specific implementation, the chair includes compartments (150 and 151) (FIG. 1) within the rear and front frame elements (91 and 92). The compartments (150 and 151) can provide storage options of varying size and means of access. The compartments (150 and 151) can be configured as fixed, removable, nested volumes or any combination. The compartments (150 and 151) and their enclosures may also be configured to slide, extend, retract, be hinged, rotate, pivot, lock, be spring-tensioned, and include magnetic, snap-on or mechanical fastening or any combination.

Other Embodiments

Figure 7:
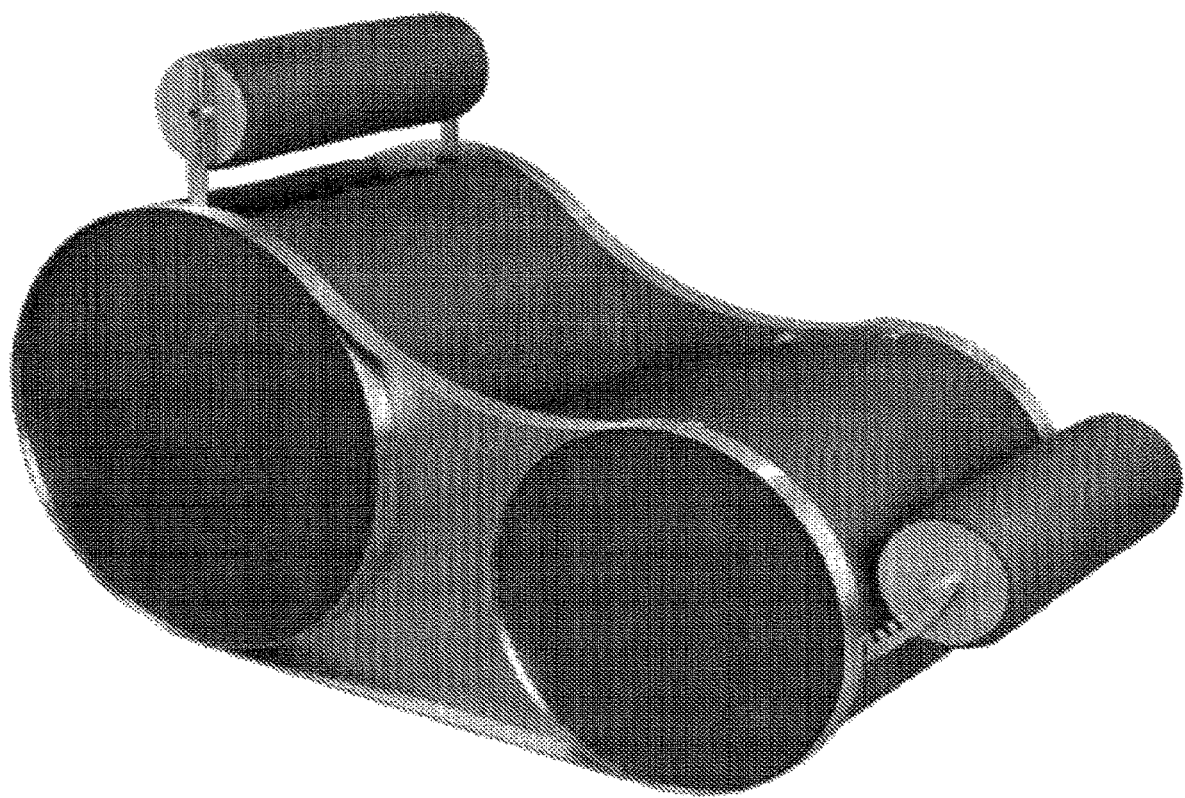
FIG. 7 shows a chair in some embodiments.

FIG. 7 shows a chair in some embodiments.

In some embodiments, the chair has a pre-tensioned but flexible seating that dynamically adapts to the occupant's weight, shape and movement. The primary objective is to minimize the physiological consequences of sitting by reducing muscle tension, reversing skeletal compression and increasing blood circulation. The occupant is placed in a slouch-proof, fully supported, weight-displacing and circulation-enhancing recumbent position. A cushioned headrest that can be micro-adjusted to 100 unique positions minimizes the muscle fatigue that typically develops in the back, neck and shoulders when in a standing or upright sitting position. The flexible seating surface spontaneously adapts to the unique contours of the occupant and allows the occupant's torso to sink incrementally. The head, back and legs are supported in a way that helps keep the spine in its natural (lordotic/kyphotic) and decompressed state. The supportive confluence of an adaptive user defined contour, targeted resistance that aligns and decompresses the skeleton, and a fully supported recumbent seating position places the body in a subtle state of traction.

In some embodiments, the chair incorporates a dual-purpose pivoting display interface (PDI) that revolves from it's default standup desk position around the seated occupant. The PDI can be paired with a laptop and used as a dual-screen interface in both a seated or standing position. When the PDI is in its default standup desk position, the chair can simultaneously accommodate both a standing and seated user within a 15 square foot. footprint.

In some embodiments, the PDI can function as a entertainment display or as a standup workstation for caregivers.

In some embodiments, the chair incorporates a privacy enclosure.

In some embodiments, the chair incorporates a footrest that can be repositioned to provide extended support for the occupant's lower legs and feet.

In some embodiments, the chair incorporates a pivoting task tray that is mobile, nested, and freely rotating. When deployed, the task tray rotates freely in response to subtle gestures of the occupant. In some embodiments, the task tray can be repositioned using rear shelf support brackets, forming a higher, alternate and adjustable work surface that can be used independently or with the PDI. In some embodiments, the task tray is stowable.

In some embodiments, the chair incorporates storage drawers that can be accessed from multiple angles in both the seated and standing positions. In some embodiments, the chair incorporates forward and aft storage that can be accessed from a forward seated position.

In some embodiments, the chair incorporates frame articulation and mechanized controls that can reposition the seating surface through a range of motion, whereby the seating angle shifts from a recumbent to a more prone, sleeping position.

In some embodiments, the chair incorporates integrated or embedded air bladders that can target and modulate the surface tension of the seating surface, which can help prevent the development of bedsores.

| Part | Ref. # | FIG. |
|---|---|---|
| Canopy support arms | 1 | 1 |
| Canopy support bracket | 2 | 1 |
| Canopy pivoting hinge connection | 3 | 1 |
| Canopy structural cross support | 4 | 1 |
| Canopy shade | 5 | 1 |
| Spring pinged/plunder | 6 | 1 |
| Display tray | 20 | 1 |
| Display support connector | 21 | 1 |
| Display support arm | 22 | 1, 2 |
| Pivoting display support arm in angled position | 23 | 1 |
| Display support range of motion | 24 | 1, 5 |
| Pivoting display support arms in vertical position | 25 | 1 |
| Torsion spring for display support arm | 26 | 2 |
| Display support arm guide wheels | 27 | 5 |
| Display support arm counterweight | 28 | 5 |
| Headrest (rotational adjustable spring tensioned) | 30 | 1, 2 |
| Headrest coupling mechanism | 31 | 2 |
| Stepped notches | 32 | 2 |
| Shared channel | 33 | 2 |
| Plunger | 34 | 2 |

-continued

| Part | Ref. # | FIG. |
|---|---|---|
| Rotationally adjustable headrest support arm | 35 | 2 |
| Punched hole pattern for spring pin/plunger (connection of headrest and keyboard support arms or any other radial adjustable support arms) | 39 | 2 |
| Utility shelf | 40 | 1 |
| Utility shelf nested in rotated seat position | 41 | 1, 3c |
| Lower body support element | 42 | 1, 3c |
| Slotted pin rests for utility shelf | 43 | 1 |
| Utility shelf in the rear non-rotated position | 44 | 1, 3c |
| Utility shelf radial notches | 45 | 3a |
| Fixed utility shelf support arm | 46 | 1 |
| Rotating utility shelf support arm | 47 | 1 |
| Utility shelf rotated positioned and nested within extended footrest support arms | 48 | 1 |
| Utility shelf top opening | 49 | 3a |
| Utility shelf through holes | 50 | 3a |
| Utility shelf through holes | 51 | 3a |
| Utility shelf flat surface | 52 | 3a |
| Utility shelf flat edges | 53 | 3a |
| Utility shelf radial edges | 54 | 3a |
| Holes and/or recesses for accessories such as cup holder, remote, phone, keyboard, trackpad, etc.) | 55 | 3b |
| Lower body support element | 70 | 1, 2 |
| Adjustable strap for leg and footrest I | 71 | 1 |
| Foot rest support arm | 72 | 2 |
| Foot rest support arm | 73 | 2 |
| Removable storage container | 74 | 2 |
| Lower body support structure nested within extended footrest support arms | 75 | 2 |
| Rail | 89 | 2 |
| Rear frame element | 91 | 1 |
| Front frame element | 92 | 1 |
| Ring rotation support wheel | 93 | 1 |
| support assembly | 94 | 1 |
| support sub frames | 95 | 1 |
| Support wheels | 96 | 1 |
| Bottom support structures | 97 | 1 |
| Cross support structures | 98 | 1 |
| rear frame element support (e.g. headrest, utility shelf and canopy supports) | 99 | 2 |
| Axial cross support structure | 100 | 2 |
| frame coupling mechanisms | 101 | 2 |
| Side support structures | 102 | 2 |
| Torsion spring | 103 | 5 |
| Tensioned wheel assembly | 104 | 5 |
| Rear frame element container | 150 | 1 |
| Front frame element container | 151 | 1 |
| Rear bladder | 170 | 2 |
| Front bladder | 171 | 2 |
| Pump/regulatory assembly | 172 | 5 |
| Hoses | 173 | 5 |
| Motor assembly | 174 | 5 |
| Motor gear arm | 175 | 5 |
| Seating support structure | 190 | 1 |
| Back support surface | 191 | 2 |
| Seating surface | 192 | 2 |
| Headrest cushion assembly | 200 | 4 |
| Fabric enclosed cushion | 201 | 4 |
| Headrest support rod | 202 | 4 |
| Spacer or one way bearing when used in conjunction with headrest coupling mechanism | 203 | 4 |
| Radial spring cap plate | 204 | 4 |
| Radial spring fixed to a disk that is fixed to the anchoring rod | 205 | 4 |
| Radially stepped and notched spring tensioning disk | 206 | 4 |
| Radial spring cap plate | 207 | 4 |
| Headrest assembly cap plate | 208 | 4 |
| Spring pin plungers | 209 | 4 |
| Dual and extended quick adjust spring pin plungers | 210 | 4 |
| Structural headrest cushion core | 211 | 4 |

Tray with Variable Positioning and Support

In some embodiments, a portable tray and tray supports provide an elevated surface that can be rotationally and/or proximally adjusted to accommodate a variety of angled positions. In specific implementations, the tray and tray positioning are adjustable to provide ergonomically desirable positions that may enhance a user's health and cognition by minimizing the typical task-based musculoskeletal stresses and fatigue that develop throughout the back, neck, shoulders, arms, head and eyes while standing, sitting, reclined or in a recumbent seated position.

In a specific implementation, the tray and tray supports provide an elevated task surface that can be rotationally and/or proximally adjusted to provide for more ergonomically desirable body positions while standing or in any upright, reclined or recumbent seated position. The tray and the tray supports are proportioned to provide an elevated task surface that can be rotationally adjusted to provide the user an ergonomically desirable field of vision while also maintaining a co-planar surface angle with user's arms, wrists and hands. The tray and the tray support are also uniquely proportioned and adjustable such that a reclined or recumbently seated user can minimize any unwanted stress on their lumbar spine by allowing their legs to be raised into more ergonomically desirable bent knee postures. The tray can also rotate bi-directionally to accommodate a wide range of body postures relative to the tray.

Figure 8A:
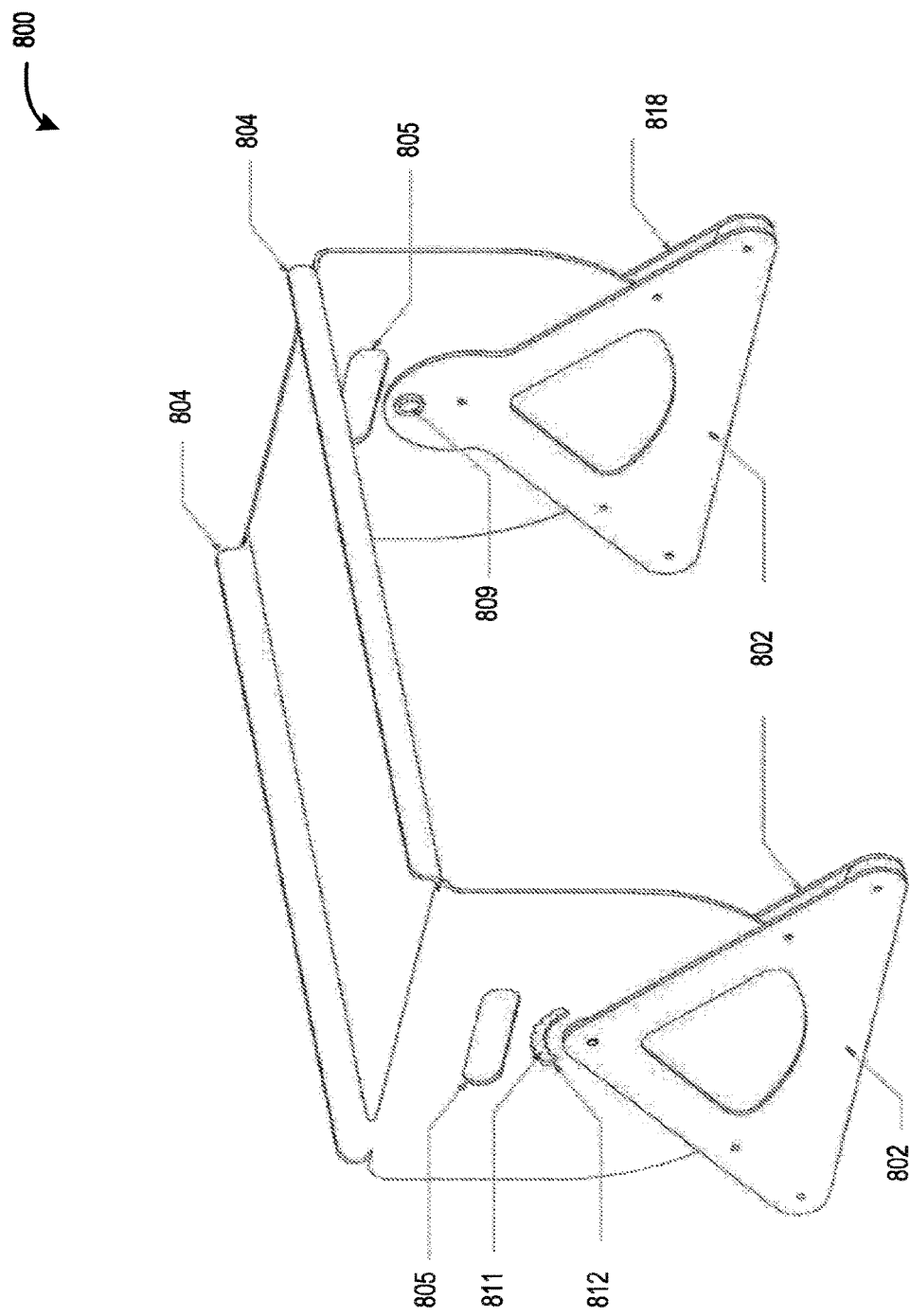
FIGS. 8A-P show a tray with variable positioning and support in some embodiments.
Figure 8C:
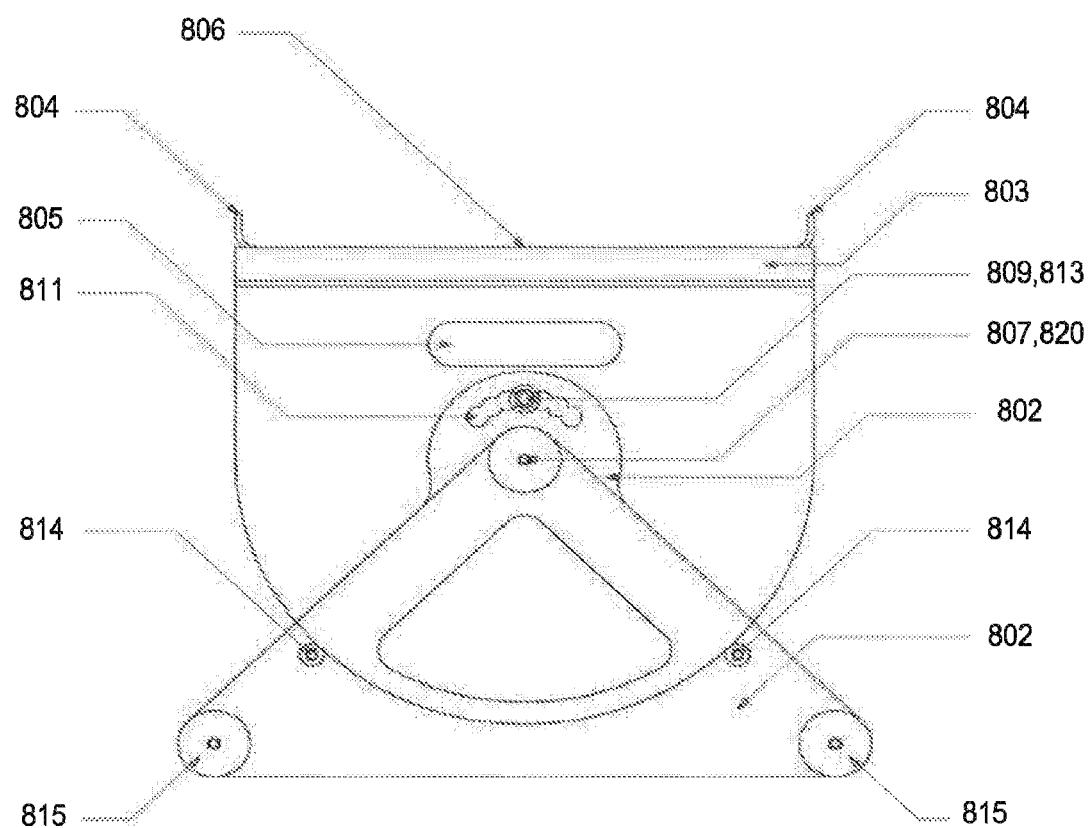
Figure 8D:
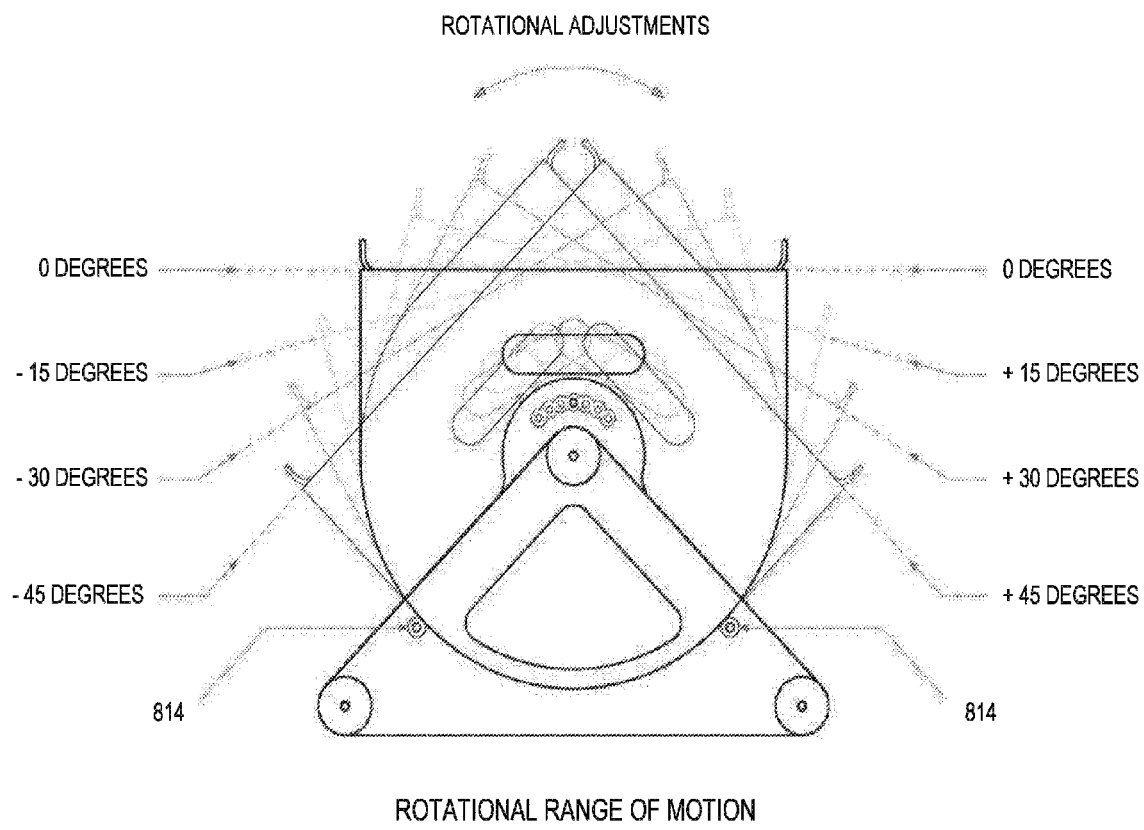
Figure 8E:
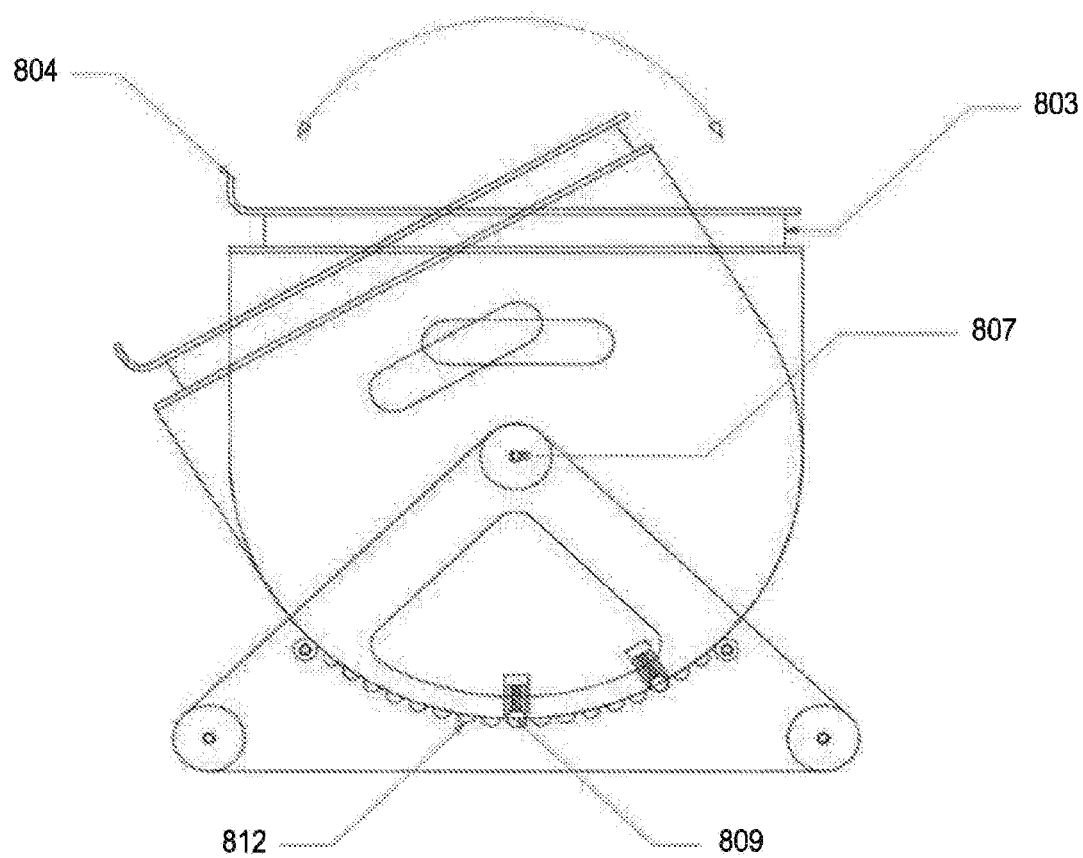
Figure 8F:
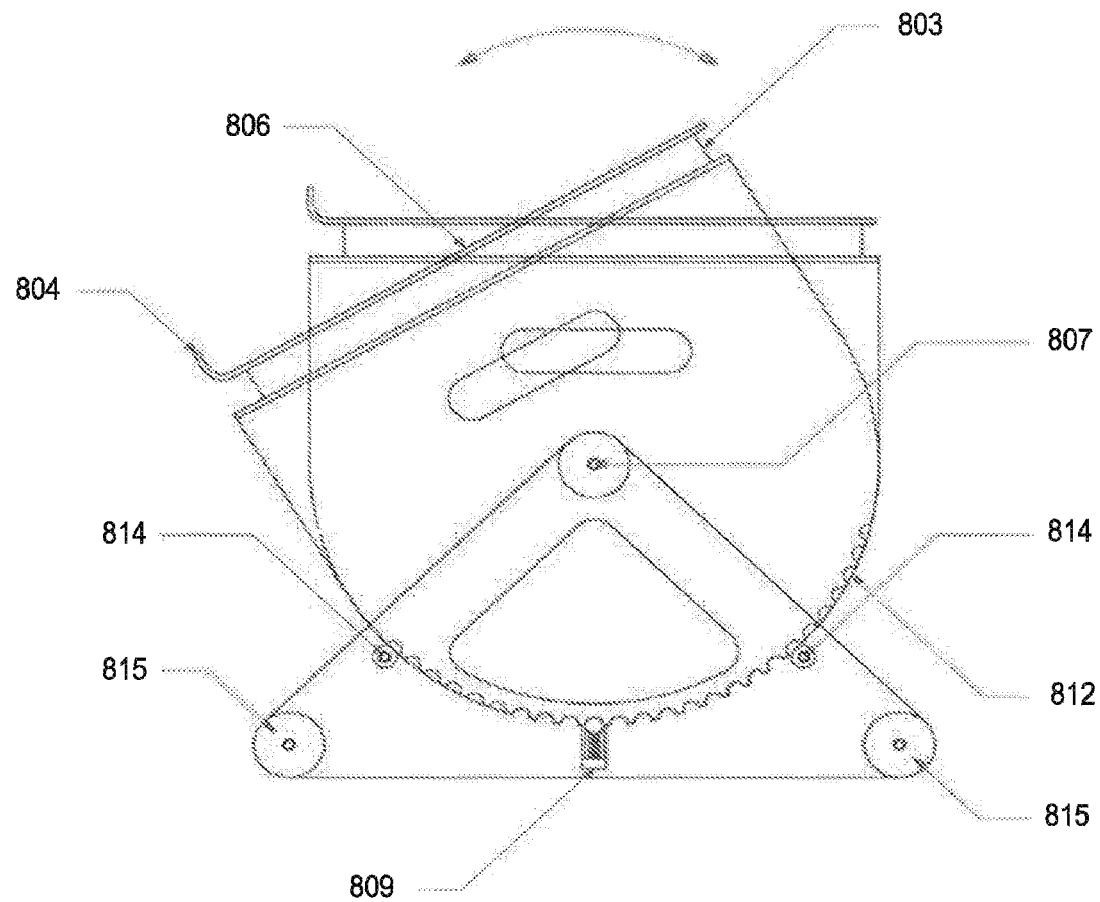
Figure 8G:
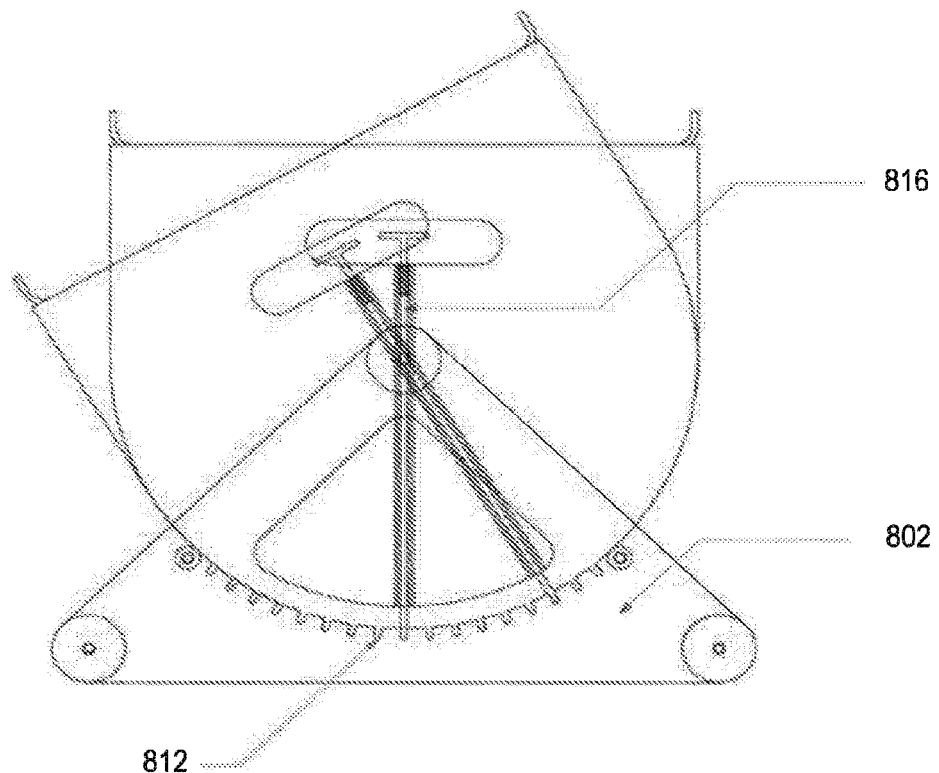
Figure 8H:
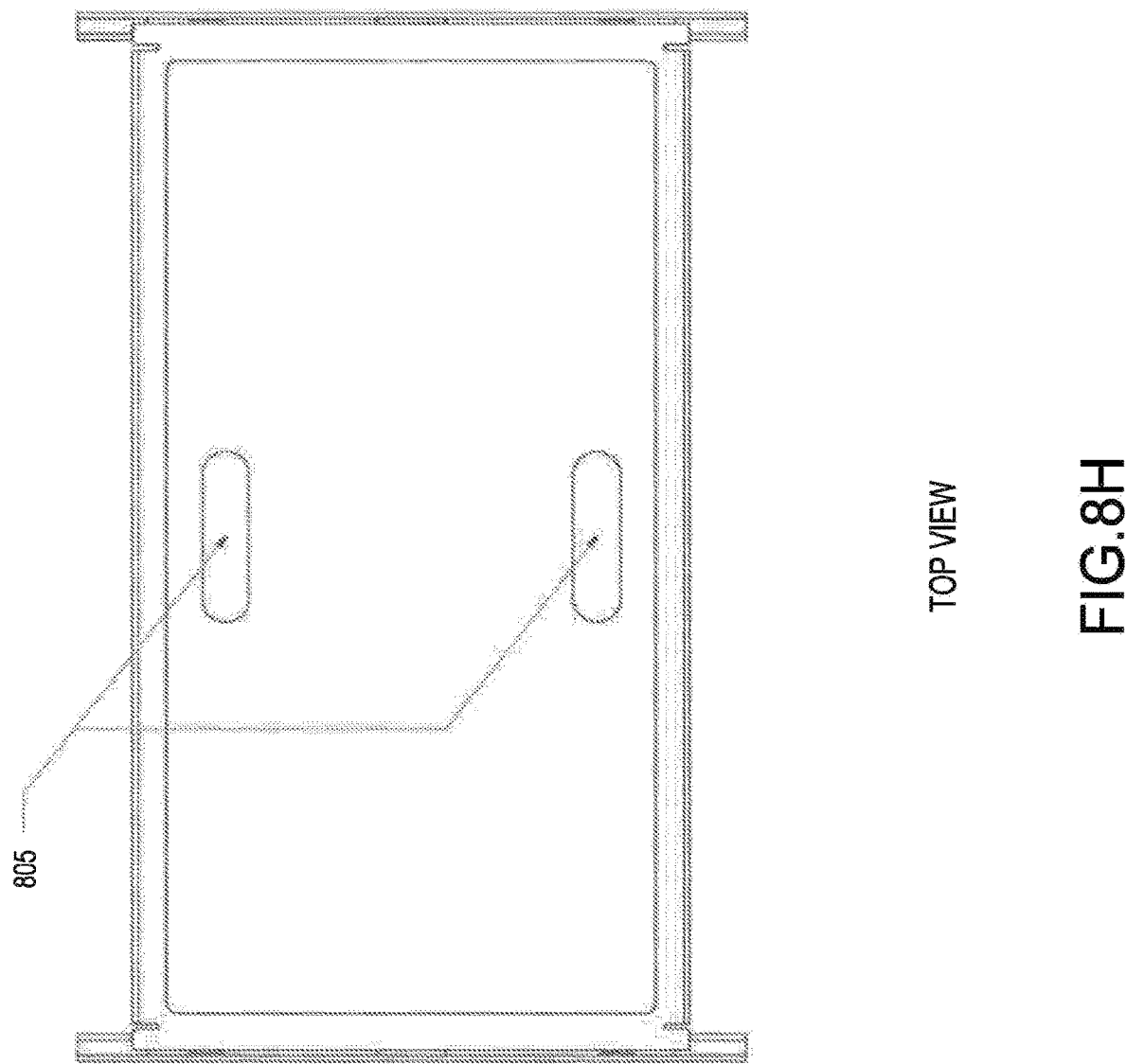
Figure 8I:
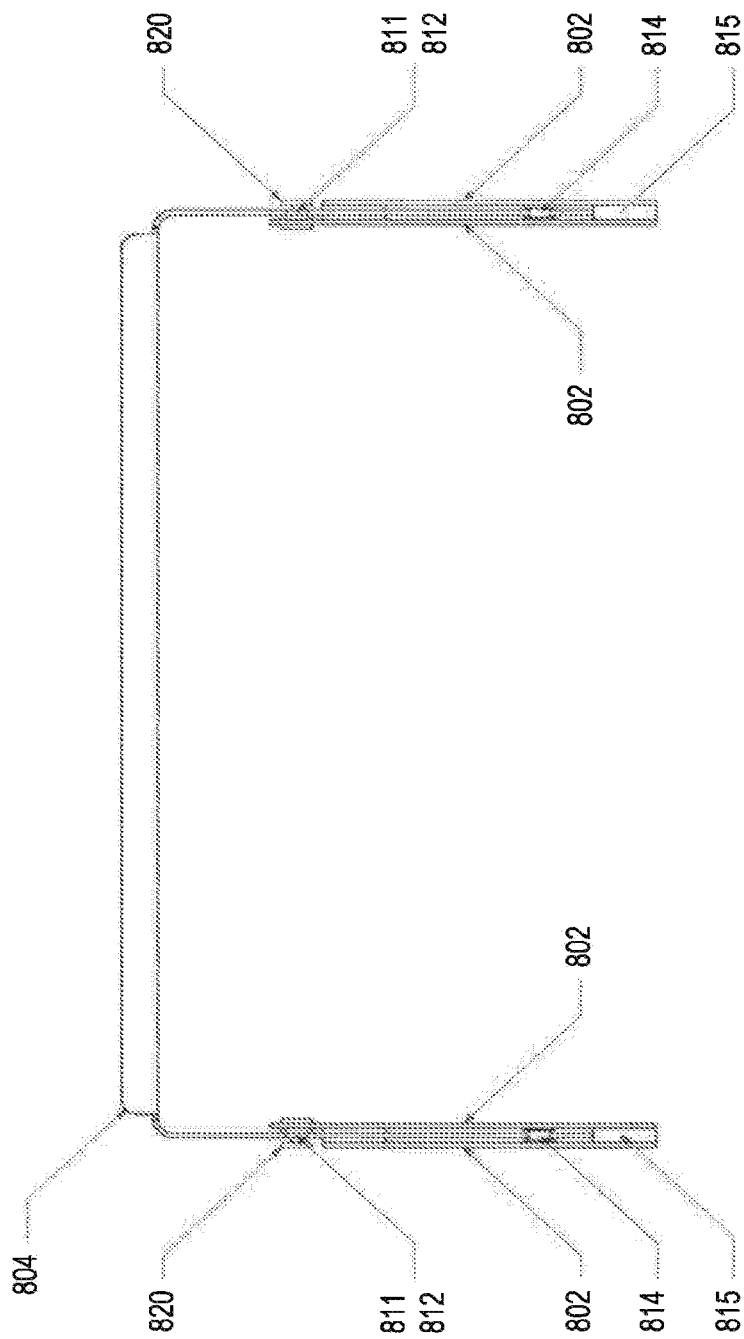
Figure 8K:
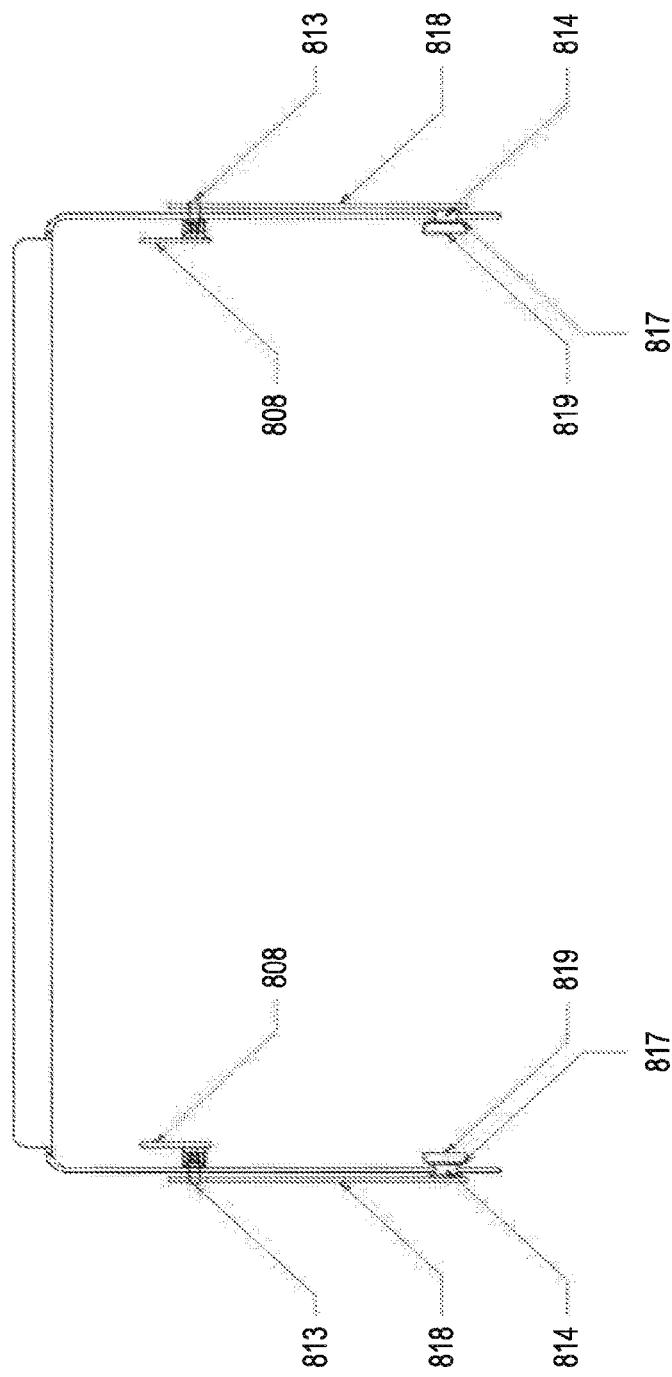
Figure 8L:
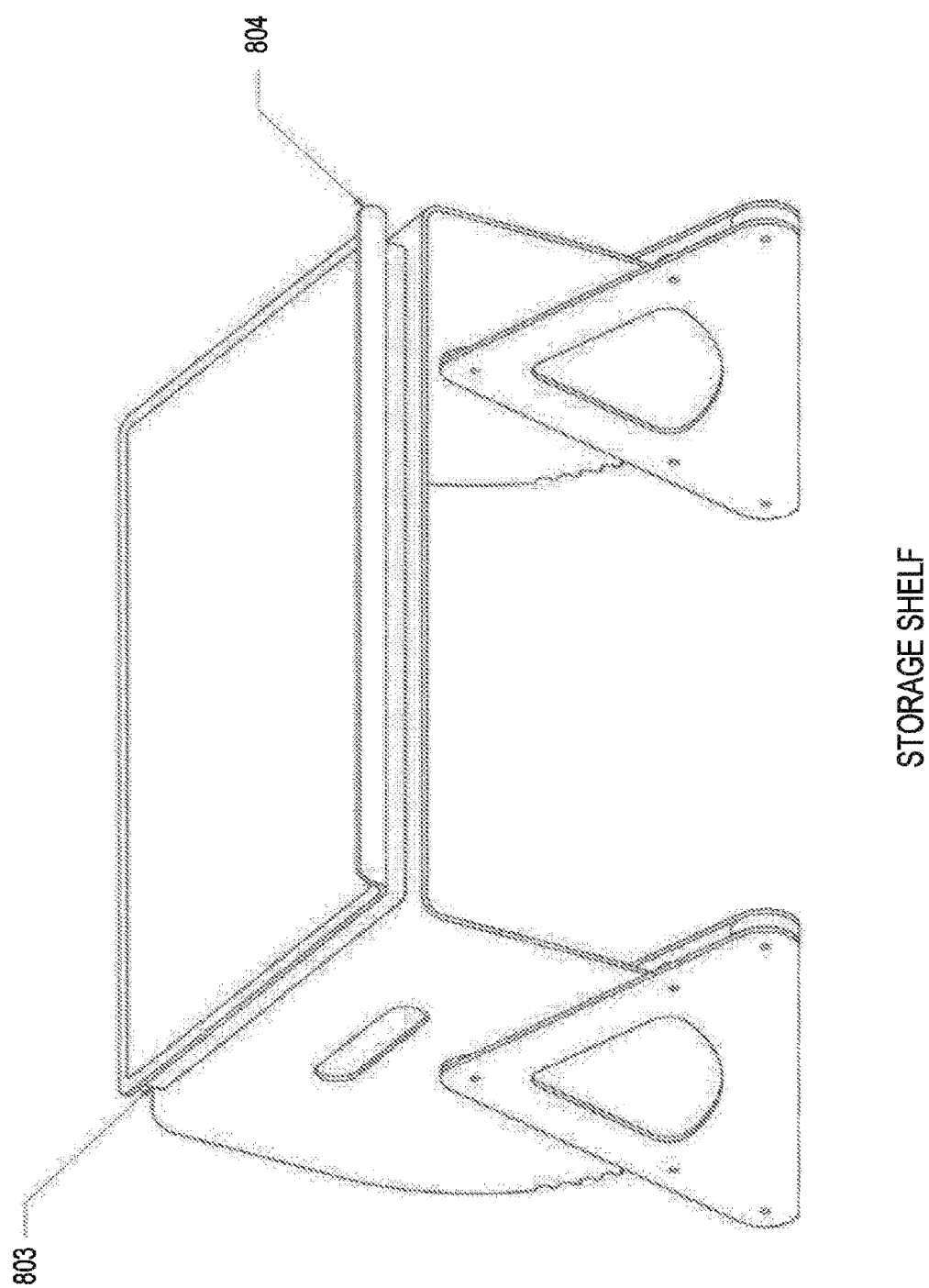
Figure 8M:
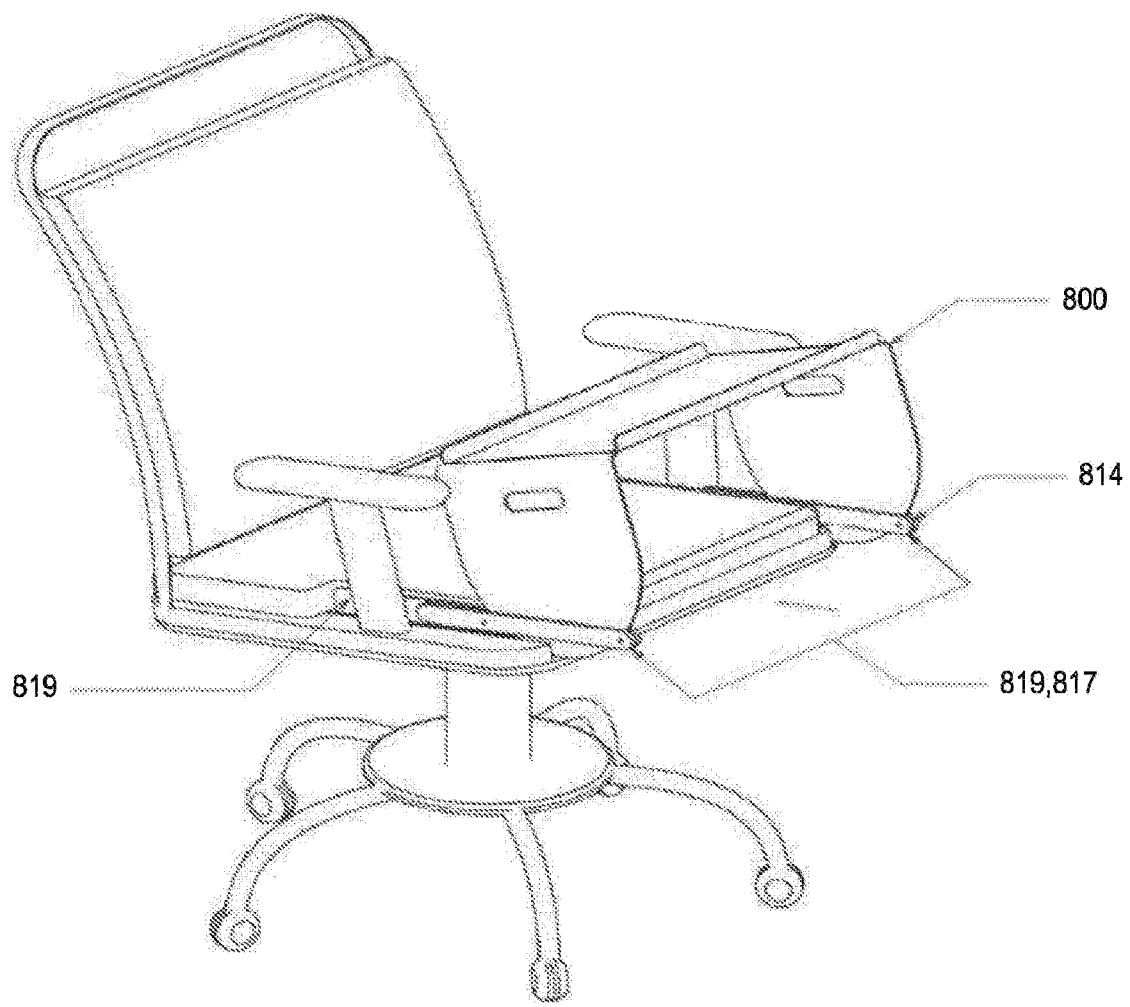
Figure 8N:
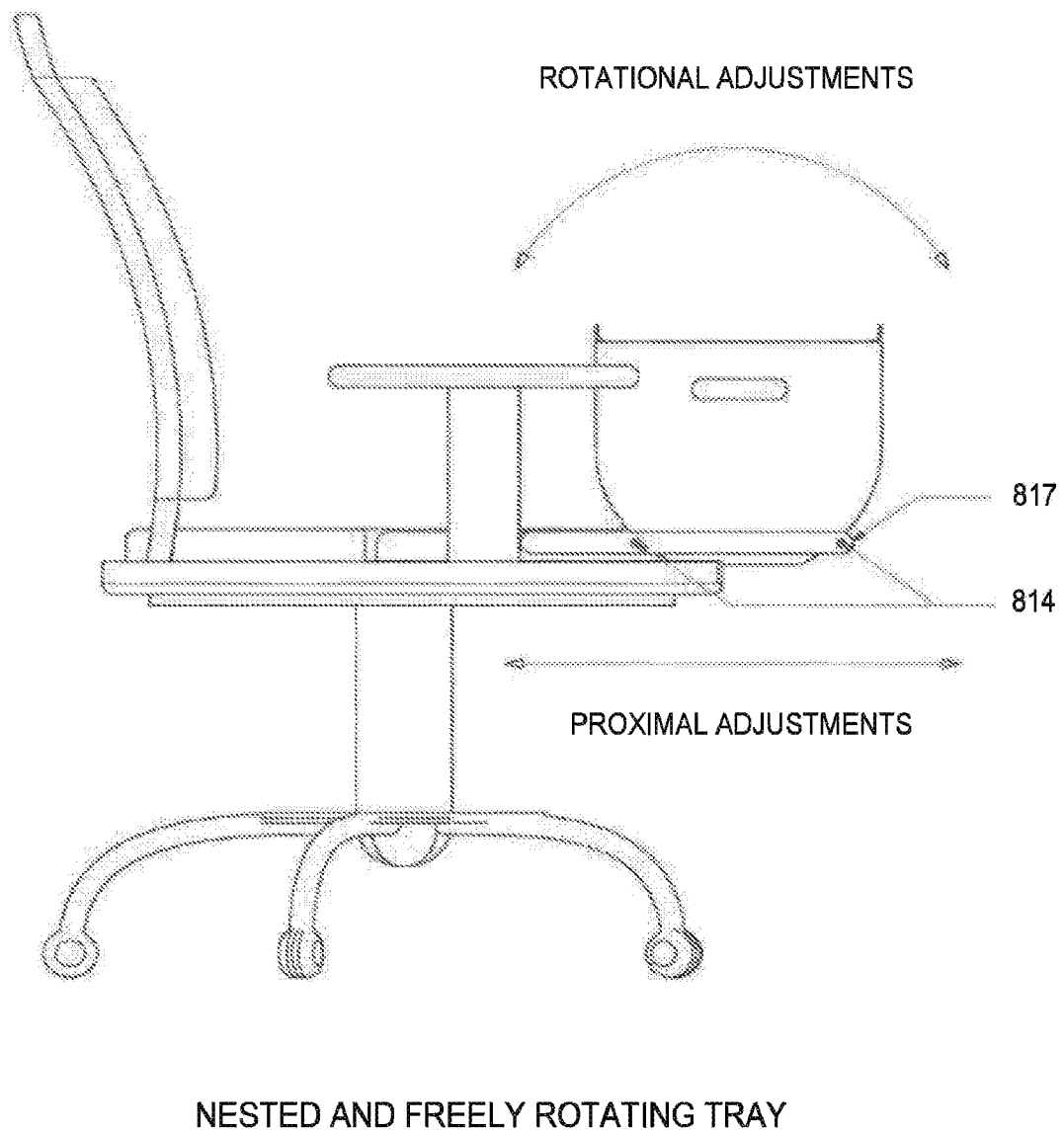
Figure 8O:
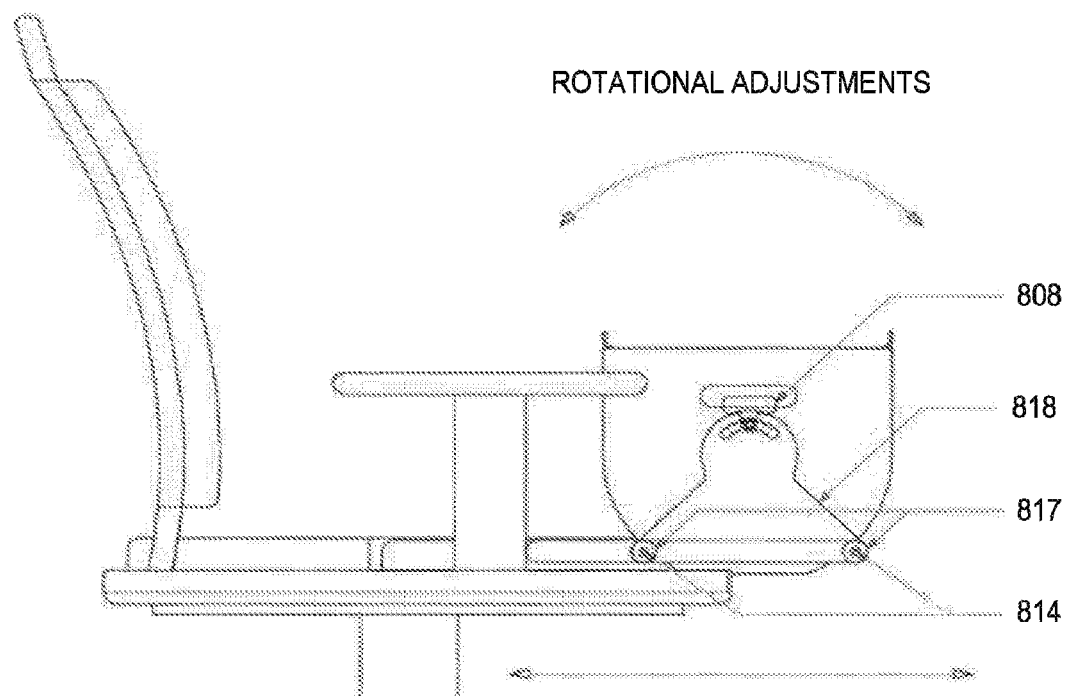
Figure 8P:
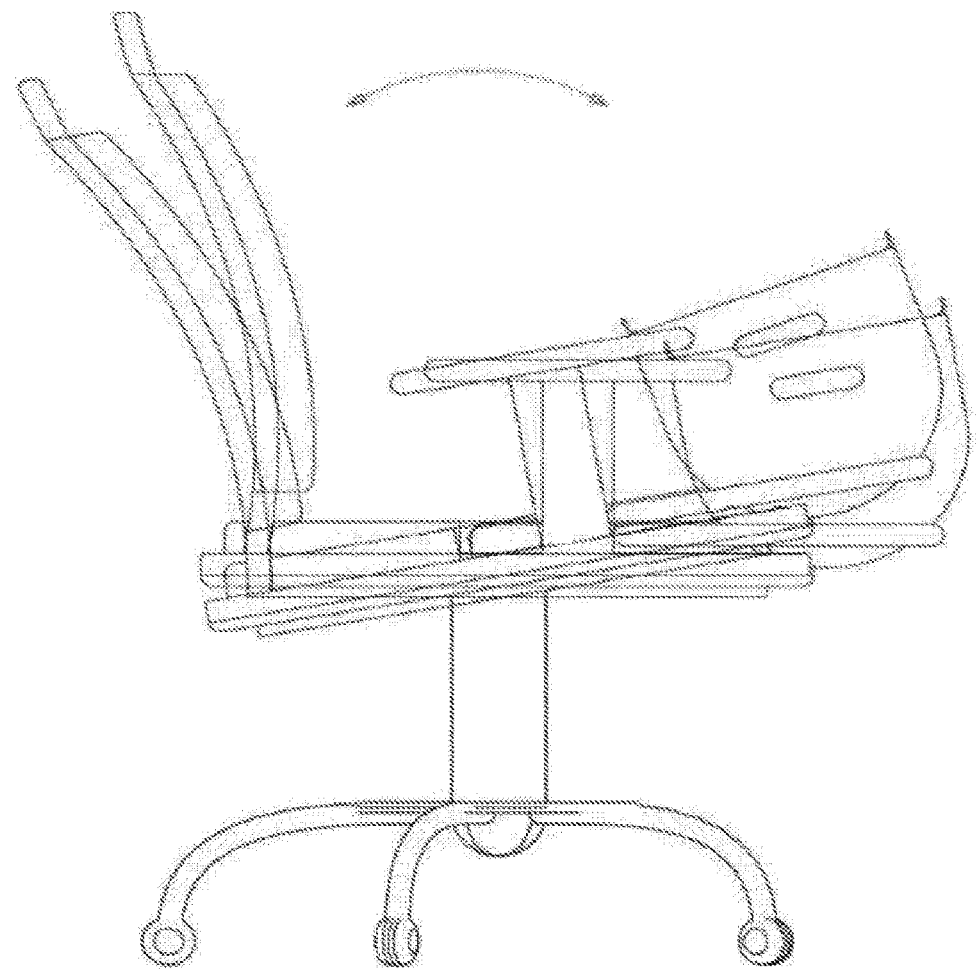
Figure 9A:
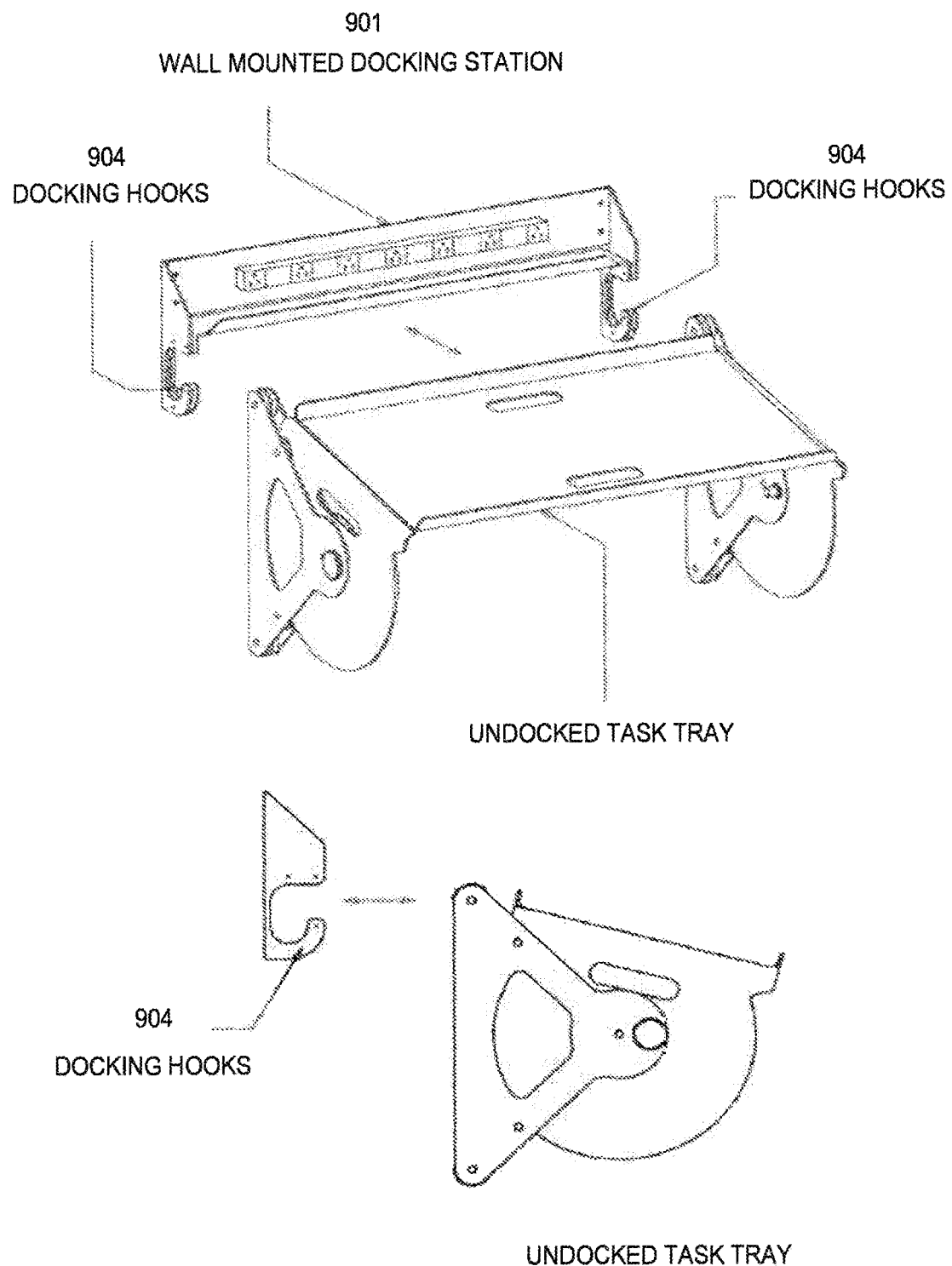
FIGS. 9A-D show a task tray docking station in some embodiments.
Figure 9B:
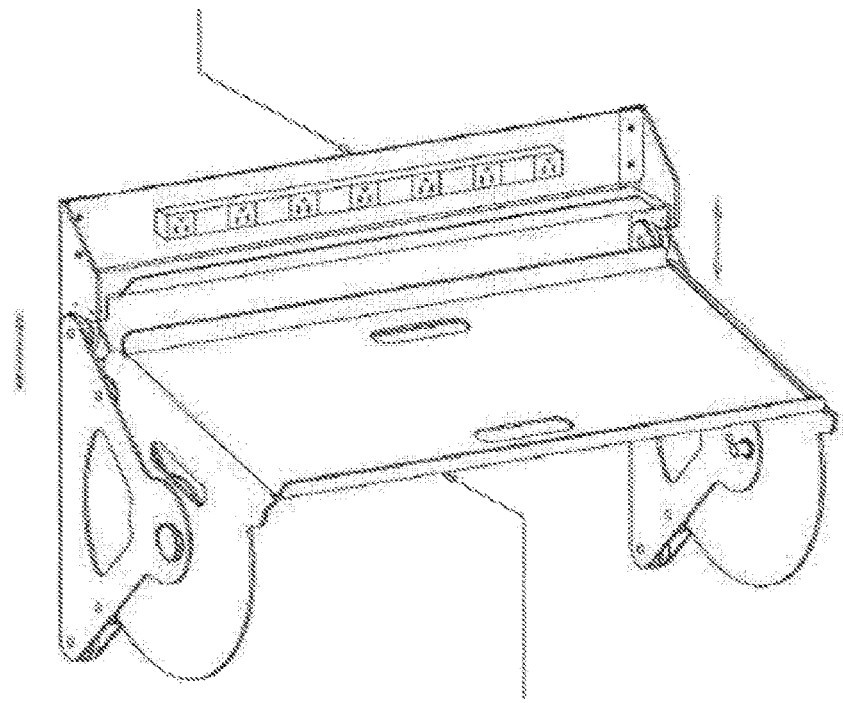
Figure 9B:
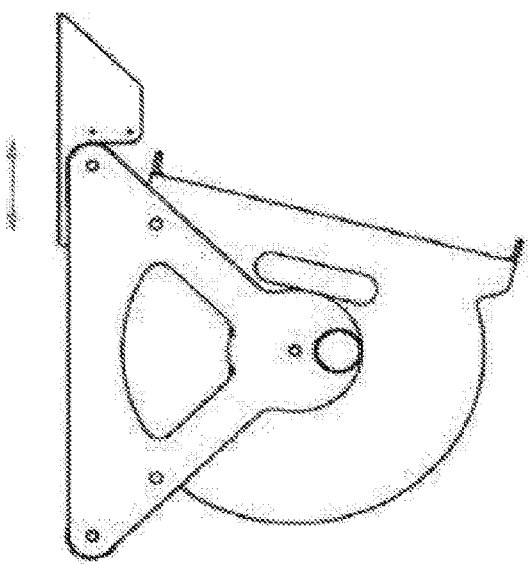
Figure 9C:
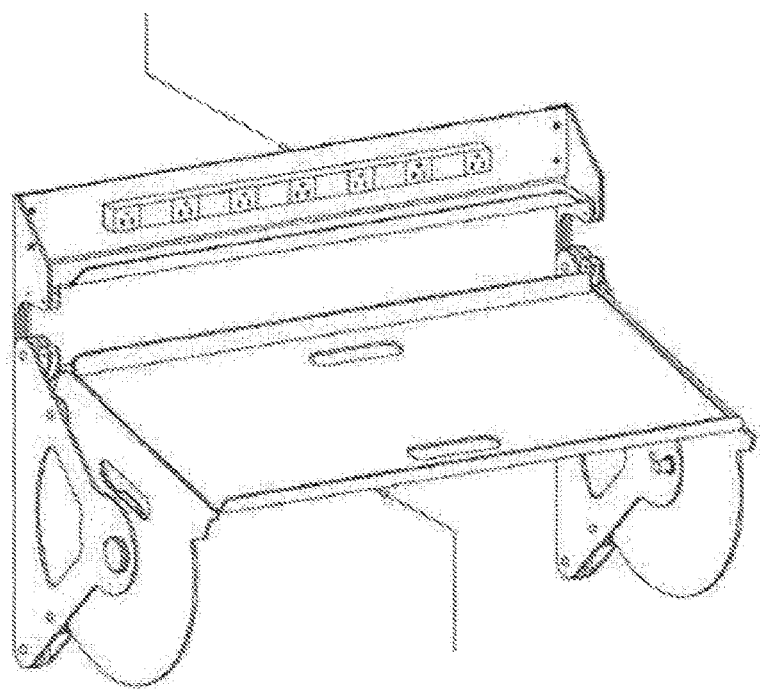
Figure 9C:
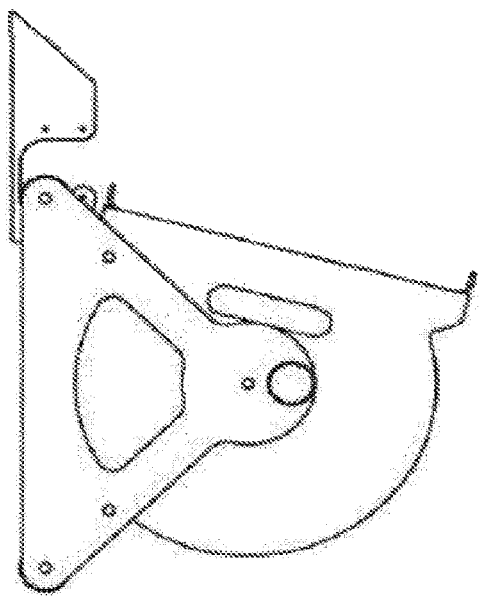
Figure 9D:
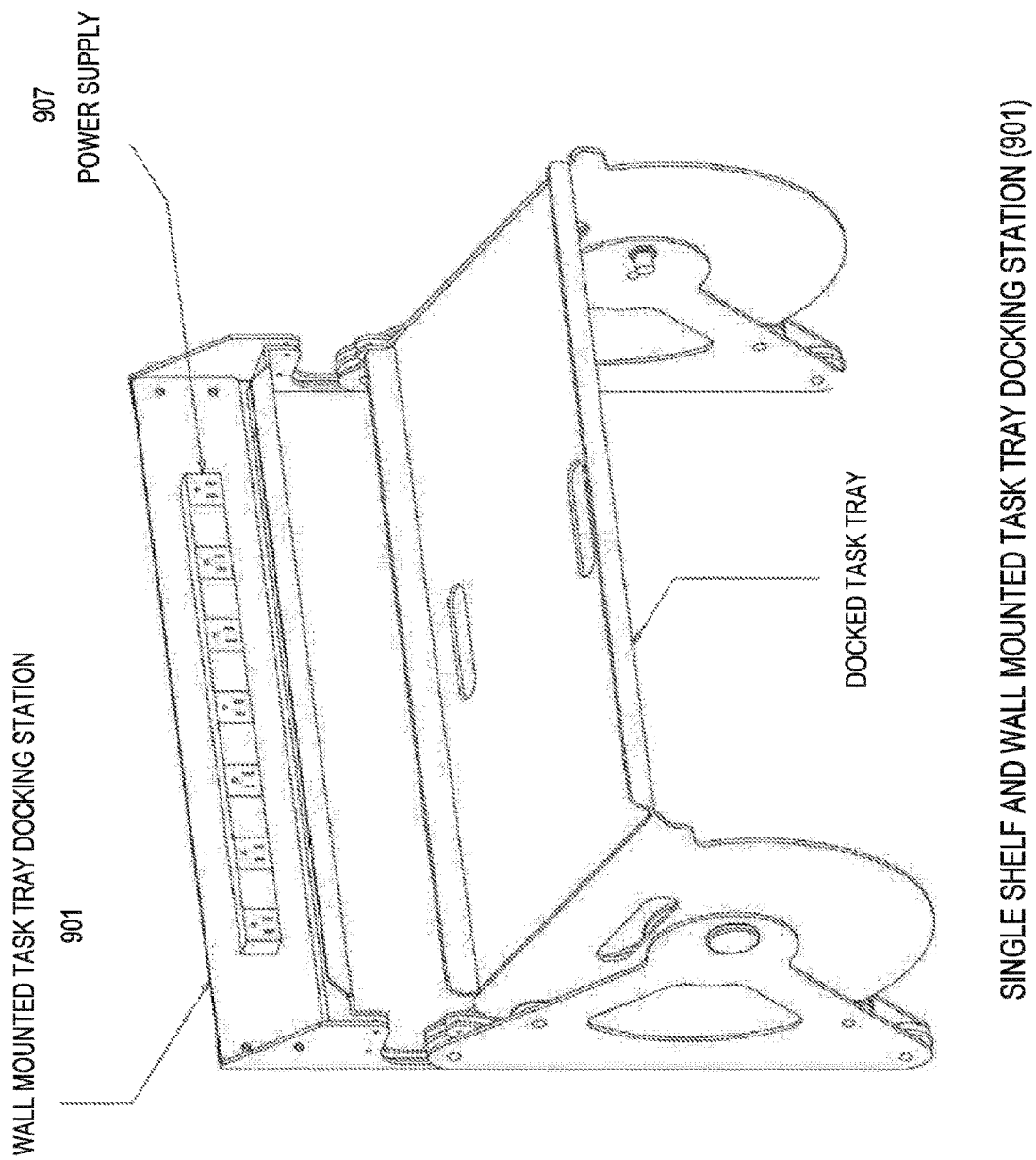
Figure 10:
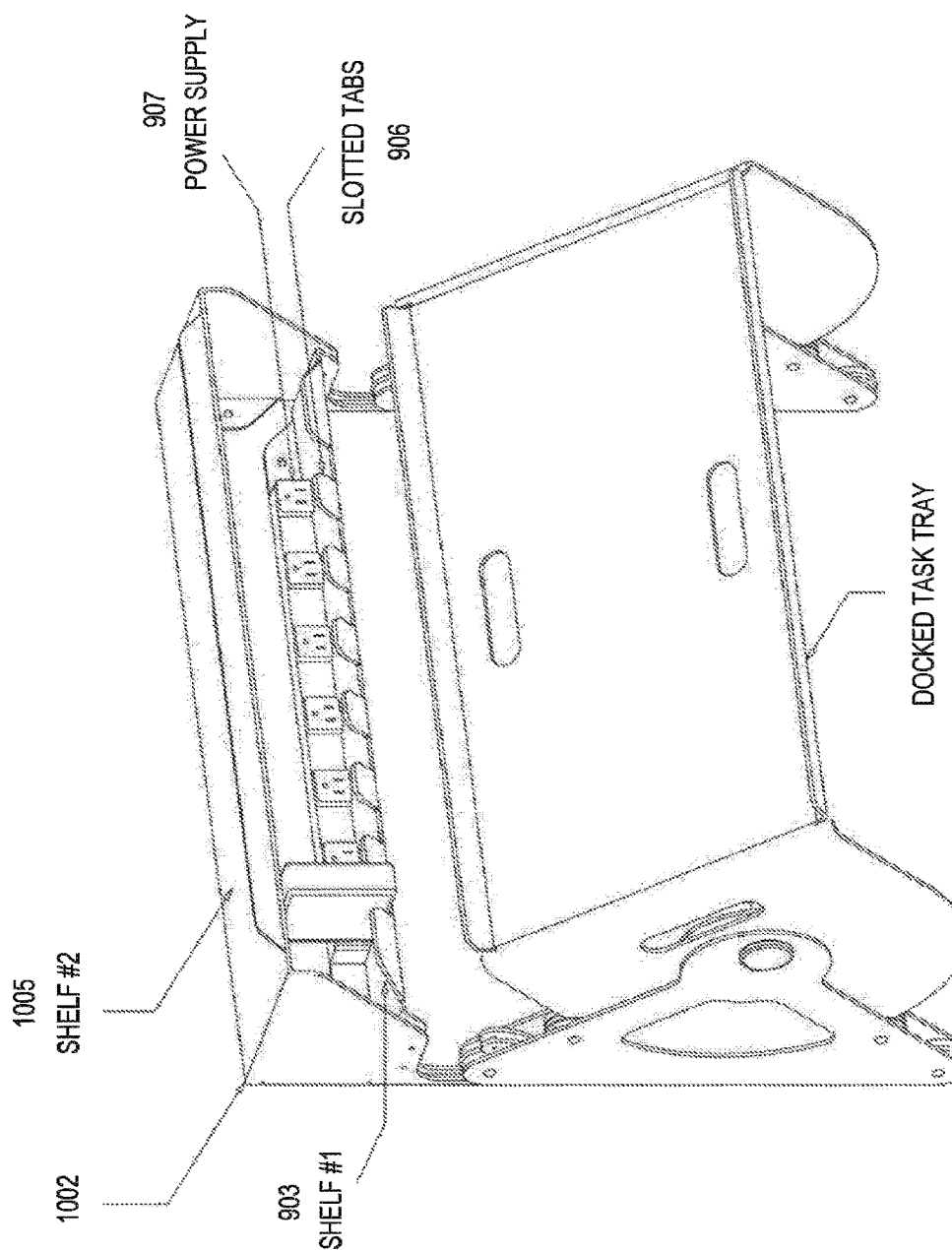
FIG. 10 shows a task tray docking station in some embodiments.

FIGS. 8A-P show a tray 800 with variable positioning and support in some embodiments. The tray 800 and the various tray supports 102, 107, 114, 117, 118, 119, may be designed in proportion and functionality such that, within specific configurations (e.g., as shown in FIGS. 8A-H), the tray can independently or with supports (e.g., as shown in FIG. 8A) be placed on top of a typical height desk and used as an elevated standing desk. The tray can (e.g., as shown in FIG. 8B) be placed on a typical height desk and used as a flat or angled shelf to help a seated user organize, display or store reference materials, devices or any items that would otherwise be less visually, physically or readily accessible, and provide or increase the available task surface of any object upon which the tray is placed. The tray, with or without tray supports can also (e.g., as shown in FIG. 8C) be placed directly on any surface that supports users when they are in more ergonomically desirable reclined or recumbent seating positions. The tray and tray supports can (e.g., as shown in FIG. 8D) be configured with quick-connect/release connections that allow the tray and tray supports to engage/disengage from each other. In a specific implementation, this connection may also control the rotational adjustments of the tray within the tray supports. The tray can (e.g., as shown in FIG. 8E) nest within and/or on top of supports, support channels, tracks, pivots, bearings, wheels, or any combination, that are independent or connected to any other object and may allow the tray to travel through ranges of motion that help to rotationally and/or proximally optimize the positioning of the tray relative to the user (e.g., as shown in FIG. 8O). The tray can (e.g., as shown in FIG. 8F) be configured with any number of open and/or enclosed shelf and/or storage compartments 103 that provide immediate stowage, access and/or portability of materials and/or devices within the tray when an alternate work posture or space is desired. Additionally (e.g., as shown in FIG. 8G), the tray may incorporate raised edges or rails 104, indentations, magnetic or non-slip surfaces 106 that help organize and/or prevent objects from sliding off the tray surface. The tray may also include (e.g., as shown in FIG. 8H) through holes 105 or handles, on any surface to provide for dual or single hand grip configurations.

Ergonomic Benefits: Arms, Wrists, Hands

In some embodiments, the tray can be used as a flat elevated surface or be rotationally adjusted so that the surface tilts toward or away from the user (e.g., as shown in FIG. 8D). This rotational adjustment helps maintain an ergonomically desirable co-planar angle between the user's arms and the tray surface. If the tray surface is higher than the users arms, it can be adjusted downward toward the user to achieve a more arm-tray co-planar alignment. If the tray surface is lower than the users arms, it can be adjusted downward away from the user to achieve a more arm-tray co-planar alignment.

Ergonomic Benefits: Head, Neck, Shoulders, Spine, Vision

In some embodiments, the tray's ability to be rotationally and/or proximally adjusted allows any material or devices that are placed on it, such as food, a book, a laptop computer, a keyboard, a tablet or printed documents to be better positioned within the user's most ergonomically desirable line of sight, range of sight and angle of sight. In doing so, the tray and/or tray supports increases the number of ergonomically desirable positions available to the user relative to the task-specific materials or devices with which they chose to interact. In particular, this ergonomic system allows the user to assume a more supported, neutral and healthier reclined posture that helps to minimize any musculoskeletal stresses and fatigue that may develop within the head, neck, spine and/or eyes while standing or sitting upright in an otherwise ergonomically demanding user/desk configuration.

Ergonomic Benefits: Lumbar Spine, Circulation

In some embodiments, the tray's proportions and ability to be rotationally and/or proximally adjusted allows the user to sit in more ergonomically desirable reclined or recumbent seated positions that provide the user functional proximity to a supportive task surface, materials and/or devices that would otherwise fall out of their ergonomically desirable range of vision and proximity as they recline. Whether the tray is fixed to dynamic supports that move simultaneously with the user, such as supports that are connected to a chair (e.g., as shown in FIG. 8P) or the user is supported in recumbent position, such as a bed or lounge chair, the tray's proportions and ability to be rotationally adjusted independently or within the tray's support/s allow the user to raise their legs unimpeded. This allows the user to be positioned within close proximity to an ergonomically desirable Neutral Body Posture that, in part, is defined by a bent-leg posture. The Neutral Body Posture, by definition, is the default position the human body assumes within microgravity and represents a physical state of human musculoskeletal equilibrium. It was discovered, defined and documented by NASA during a series of biomechanical studies of humans within micro gravitational conditions. Assuming any other posture requires muscular effort. A recumbent seating position is the closest proximity to the Neutral Body Posture and it minimizes unwanted stress on the lumbar spine and the development of circulation pinch points when the body is in a compressive upright seated position.

Design Implementations

In some embodiments, the tray and tray supports 802, 807, 814, 817, 818, 819 are designed to provide multiple implementations that allow the tray to be positioned and move through ergonomically optimal, rotational and proximal ranges of motion relative to the body positioning of the user (e.g., as shown in FIG. 8D, 8N, 8O). In a specific implementation, the tray 800 can be connected to the inner and outer tray supports 802 with a fixed connection 807 that allows the tray to pivot within the tray supports, and within the limitations of the rotational guides/stops 814 (e.g., as shown in FIG. 8J). In a specific implementation (e.g., as shown in FIG. 8K and FIG. 8O), the tray 800 can be quick-attached/released to openings in the tray supports 818 by reaching through the side hand grip openings 805 in the tray and depressing the interior tabs 808 that engage/disengage the spring plungers 813. In a specific implementation (e.g., as shown in FIG. 8J), the tray 800 can be rotationally adjusted within the fixed tray supports by depressing the interior tabs 808 to disengage the tray support-mounted spring plungers 813 from radial openings and/or channels 811 within the tray. These tabs 808 control the rotational adjustment of the tray once the tray is positioned within any of the fixed or quick-attach/release tray supports 802, 807, 814, 817, 818, 819 when the plunger is aligned and/or engaged within the radial openings 811, 812 in the tray or tray support configurations (e.g., as shown in FIGS. 8J, 8K, 8O). In a specific implementation, a spring-tensioned ball catch 809 can, and in place of spring plungers 813, provide the tray a slip-locking connection through the radial openings within the tray 811, 812 that allows the tray to be rotationally adjusted within the tray supports 818. In a specific implementation (e.g., as shown in FIG. 8I), tray-mounted spring plungers 816 may also control the rotational adjustment of the tray through the side hand grips 805 by engaging/releasing the plunger 816 within openings 812 in the tray supports 802. In a specific implementation (e.g., as shown in FIG. 8E), tray-mounted ball catches 809 may provide slip-locking connections that allow rotational adjustment of the tray by engaging/releasing from openings 812 within the tray supports 802 and within the rotational limitations of the tray guides/stops 814. In a specific implementation (e.g., as shown in FIG. 8F), tray support-mounted ball catches 809 may provide slip-locking connections that allow rotational adjustment of the tray by engaging/releasing from openings 112 within the tray. In a specific implementation (e.g., as shown in FIG. 8I), spring-loaded and support-mounted plungers with stepped diameters 820 provide rotational adjustment of the tray by engaging/releasing the larger and locking diameter from radial openings within the tray. The smaller diameter of the plunger extends beyond the opening of the tray and travels unimpeded through a shared radial channel 811 that connects the grouping of larger openings 812 when the larger diameter of the plunger is disengaged from any of its locked positions. In a specific implementation, the extension of the smaller diameter of the plunger provides for connecting a tab/button 820 to aid in engaging/releasing the larger diameter of the plunger and the rotational control and adjustment of the tray.

The tray and/or tray supports may connect directly to support channels, tracks, pivots, bearings, gears, belts, motors, electric controllers, wheels, or any combination, that are attached to or connect to another object, such as a chair, and allow the tray and/or the tray supports to travel through ranges of motion that rotationally and proximally optimize the positioning of the tray relative to the user.

In a specific implementation, the tray, tray supports and/or tray support assemblies may also be configured with auto-locking or manual locking connections that regulate the positioning of the tray and/or tray supports and/or tray assemblies or any combination. These connections may include spring-loaded ball catches, spring-loaded cylinders, spring-loaded and/or locking plungers, gears, belts, friction, clamping or threaded connections, bearings, pivots, fixed structural elements or any combination. In a specific implementation, there may be channels within the tray or its supports and support assemblies that allow for slip-locking or spring-locking connections. These connections may include singular, multiple or grouped openings within the tray, its supports, support assemblies or any other components that allow any locking mechanism to engage by traveling into the opening/s. Grouped and multiple openings may include a continuous channel through which a plunger that engages/disengages the locking mechanism can travel and allow the tray, its supports, support assemblies or any other components to be adjusted.

The tray, the tray support members, connections and materials that make up any part of the tray assemblies may be comprised of wood, metal, alloy, plastic, foam, carbon fiber, composite, laminate or any other material. The tray and tray supports may be comprised of separate components that can be attached, detached and/or collapsed or be comprised of a singular uni-body components. Specific implementations may include additional components that connect via fixed, hinged, pivoting, rotating, extendable/retractable, inserted, detachable connections, or any combination, that allow the height of the tray and the tray support assembly to be adjusted.

Summary

In some embodiments, the tray's proportions, elevated surface, and ability to be rotationally and/or proximally adjusted, allows any reference materials or devices such as a book, a computer, tablet or printed documents to be positioned and maintain ergonomically desirable proximal and angled positions relative to the user to help minimize any musculoskeletal stress or fatigue from developing within the head, neck, back, shoulders, arms, spine or eyes of the user. The proportions of the tray and tray supports and the rotational and proximal adjustment of the tray also provides for the tray and any objects that are placed on or within the tray, to remain within the user's reach and field of vision when the user is, in particular, supported in a reclined or recumbent position, further minimizing any degree of unwanted stress and/or fatigue from impacting their lumbar back, neck, shoulders, arms, spine, head and/or eyes.

Task Tray Docking Stations

FIGS. 9A-D and FIG. 10 show task tray docking stations 901 and 1002 in some embodiments. In some embodiments, the task tray docking stations 901 and 1002 are designed to provide support brackets and surfaces that enable the task tray to be positioned and supported on vertical surfaces while also providing surfaces in support of any additional accessories, such as electronic devices, power outlets 907, lights, reference materials or personal items that may be desired.

In some embodiments, both the single-shelf 901 and multi-shelf 1002 docking stations provide docking hooks 904 with openings that, in a specific implementation, allow the feet 115 of the task tray to nest within and/or attach to the Docking Station. In a specific implementation, the feet 115 and side support brackets 102 of the task tray can be placed over and around the docking hooks to both vertically and laterally secure the task tray to the docking station without impeding the tray from being lifted and detached at any time.

In specific implementations, both the single-shelf 901 and multi-shelf 1002 docking stations may include either raised continuous and/or slotted tabs 906 that extend along the surface edges of shelves 903 and 905 and aid in stabilizing items, such as power supplies, on the surfaces of the docking stations and/or provide additional hooks from which to hang, organize or stabilize any items or accessories while the task tray is either mounted within or detached from the docking station.

The docking station may be comprised of any type of material, may be comprised of singular or multiple components and can be mounted with either fixed, slotted, suction, hook or any combination of connections.

The invention claimed is:

1. An apparatus comprising:
   a tray including a plurality of radial openings;
   an inner tray support and an outer tray support connected to the tray using a fixed connection that allows the tray to pivot within the inner tray support and the outer tray support;
   a spring-tensioned ball catch configured to provide the tray a slip-locking connection through the plurality of radial openings of the tray that allows the tray to be rotationally adjusted within the inner tray support and the outer tray support;
   a plurality of interior tabs configured to engage and disengage a plurality of first tray-support-mounted spring plungers from a first portion of the plurality of radial openings of the tray, thereby allowing the tray to be rotationally adjusted within the inner tray support and the outer tray support;
   a plurality of exterior tabs configured to engage and disengage a plurality of second tray-support-mounted spring plungers from a second portion of the plurality of radial openings of the tray, thereby allowing the tray to be rotationally adjusted within the inner tray support and the outer tray support.

2. An apparatus comprising:
   a tray including a plurality of radial openings;
   an inner tray support and an outer tray support connected to the tray using a fixed connection that allows the tray to pivot within the inner tray support and the outer tray support;
   a plurality of interior tabs configured to engage and disengage a plurality of first tray-support-mounted spring plungers from a first portion of the plurality of radial openings of the tray, thereby allowing the tray to be rotationally adjusted within the inner tray support and the outer tray support;
   a plurality of exterior tabs configured to engage and disengage a plurality of second tray-support-mounted spring plungers from a second portion of the plurality of radial openings of the tray, thereby allowing the tray to be rotationally adjusted within the inner tray support and the outer tray support.

3. The apparatus of claim 2, wherein each of the plurality of second tray-support-mounted spring plungers include stepped diameters that provide rotational adjustment of the tray by engaging and releasing a first diameter of the stepped diameters from the second portion of the plurality of radial openings of the tray.

4. The apparatus of claim 3, wherein the first diameter of the stepped diameters comprises a locking diameter larger than a second diameter of the stepped diameters.

5. The apparatus of claim 4, wherein each of the second diameters of the stepped diameters of the plurality of second tray-support-mounted spring plungers extends beyond at least the second portion of the plurality of radial openings of the tray and travels unimpeded through a shared radial channel that connects one or more first radial openings of the second portion of the plurality of radial openings of the tray when the first diameter of the stepped diameters is disengaged from a particular locked position from a plurality of different locked positions.

6. The apparatus of claim 5, wherein the extension of the second diameter of the stepped diameters provides for connecting the plurality of exterior tabs to the second diameters of the stepped diameters of the plurality of second tray-support-mounted spring plungers to facilitate engaging and disengaging the first diameters of the stepped diameters of the plurality of second tray-support-mounted spring plungers and to facilitate the rotational adjustment of the tray.

7. The apparatus of claim 6, wherein each exterior tab of the plurality of exterior tabs is configured to depress inwards to disengage a respective pair of second tray-support-mounted spring plungers of the plurality of second tray-support-mounted spring plungers, and wherein a first respective second tray-support-mounted spring plunger of the respective pair of second tray-support-mounted spring plungers is positioned relative to a first side of a respective exterior tab of the plurality of exterior tabs, and wherein a second respective second tray-support-mounted spring plunger of the respective pair of second tray-support-mounted spring plungers is positioned relative to a second side of a respective exterior tab of the plurality of exterior tabs, the second side being opposite the first side.

8. The apparatus of claim 7, wherein each exterior tab of the plurality of exterior tabs comprises a respective button.

9. The apparatus of claim 8, wherein the plurality of first tray-support-mounted spring plungers and the plurality of second tray-support-mounted spring plungers are the same, and wherein the first portion of the plurality of radial openings of the tray and the second portion of the plurality of radial openings of the tray are the same.

10. The apparatus of claim 8, wherein the plurality of first tray-support-mounted spring plungers and the plurality of second tray-support-mounted spring plungers are different, and wherein the first portion of the plurality of radial openings of the tray and the second portion of the plurality of radial openings of the tray are different.

11. The apparatus of claim 8, wherein the tray comprises an electronic docking station.

12. The apparatus of claim 1, wherein each of the plurality of second tray-support-mounted spring plungers include stepped diameters that provide rotational adjustment of the tray by engaging and releasing a first diameter of the stepped diameters from the second portion of the plurality of radial openings of the tray.

13. The apparatus of claim 12, wherein the first diameter of the stepped diameters comprises a locking diameter larger than a second diameter of the stepped diameters.

14. The apparatus of claim 13, wherein each of the second diameters of the stepped diameters of the plurality of second tray-support-mounted spring plungers extends beyond at least the second portion of the plurality of radial openings of the tray and travels unimpeded through a shared radial channel that connects one or more first radial openings of the second portion of the plurality of radial openings of the tray when the first diameter of the stepped diameters is disengaged from a particular locked position from a plurality of different locked positions.

15. The apparatus of claim 14, wherein the extension of the second diameter of the stepped diameters provides for connecting the plurality of exterior tabs to the second diameters of the stepped diameters of the plurality of second tray-support-mounted spring plungers to facilitate engaging and disengaging the first diameters of the stepped diameters of the plurality of second tray-support-mounted spring plungers and to facilitate the rotational adjustment of the tray.

16. The apparatus of claim 14, wherein each exterior tab of the plurality of exterior tabs is configured to depress inwards to disengage a respective pair of second tray-support-mounted spring plungers of the plurality of second tray-support-mounted spring plungers, and wherein a first respective second tray-support-mounted spring plunger of the respective pair of second tray-support-mounted spring plungers is positioned relative to a first side of a respective exterior tab of the plurality of exterior tabs, and wherein a second respective second tray-support-mounted spring plunger of the respective pair of second tray-support-mounted spring plungers is positioned relative to a second side of a respective exterior tab of the plurality of exterior tabs, the second side being opposite the first side.

17. The apparatus of claim 16, wherein the plurality of first tray-support-mounted spring plungers and the plurality of second tray-support-mounted spring plungers are the same, and wherein the first portion of the plurality of radial openings of the tray and the second portion of the plurality of radial openings of the tray are the same.

18. The apparatus of claim 16, wherein the plurality of first tray-support-mounted spring plungers and the plurality of second tray-support-mounted spring plungers are different, and wherein the first portion of the plurality of radial openings of the tray and the second portion of the plurality of radial openings of the tray are different.

* * * * *